(12) United States Patent
Noyes et al.

(10) Patent No.: US 7,118,090 B2
(45) Date of Patent: *Oct. 10, 2006

(54) CONTROL VALVES

(75) Inventors: Douglas B. Noyes, Upland, CA (US); Alexander David Glew, Los Altos, CA (US)

(73) Assignee: Puregress Inc., Los Altos, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 10/762,191

(22) Filed: Jan. 20, 2004

(65) Prior Publication Data

US 2005/0087711 A1    Apr. 28, 2005

Related U.S. Application Data

(63) Continuation of application No. 09/879,473, filed on Jun. 11, 2001, now Pat. No. 6,679,476.

(60) Provisional application No. 60/223,844, filed on Aug. 8, 2000.

(51) Int. Cl.
*F16K 31/524* (2006.01)

(52) U.S. Cl. .................................................. 251/263

(58) Field of Classification Search .................. 251/61, 251/149.4, 148, 152, 214, 215, 226, 227, 251/251, 252, 229, 253, 256, 257, 262, 263, 251/325, 335.2, 340, 283

See application file for complete search history.

(56) References Cited

U.S. PATENT DOCUMENTS

| | | | | |
|---|---|---|---|---|
| 2,690,917 A | * | 10/1954 | Chandler | 251/149.4 |
| 2,715,512 A | * | 8/1955 | Miller et al. | 251/148 |
| 4,667,931 A | * | 5/1987 | Egert et al. | 251/340 |
| 5,407,173 A | * | 4/1995 | Smith | 251/214 |
| 6,213,144 B1 | * | 4/2001 | Moore | 251/252 |
| 6,244,566 B1 | * | 6/2001 | France et al. | 251/263 |
| 6,679,476 B1 | * | 1/2004 | Noyes et al. | 251/263 |

* cited by examiner

Primary Examiner—Eric Keasel

(57) ABSTRACT

A compact, in-line valve assembly consists of a hollow valve body, a seat, and a first diaphragm assembly including a deflectable portion forming a first volume between the seat and the first diaphragm assembly. A second diaphragm is attached to the first diaphragm assembly such that a second volume is defined between the second diaphragm and the second opening. A third volume is formed between the first diaphragm assembly and the second diaphragm and is sealed from the first volume and the second volume. A process flows through the first diaphragm assembly between the first volume and the second volume. A low-leak rate, self-aligning head assembly including a stem and a head coupled are coupled to the first diaphragm assembly. A deflection of the deflectable portion and the second diaphragm provides movement to open and close the head from the valve seat.

47 Claims, 20 Drawing Sheets

CONTROL VALVES

This application is a continuation of U.S. application Ser. No. 09/879,473, filed Jun. 11, 2001 now U.S. Pat No. 6,679,476, of Noyes et al., for CONTROL VALVES, which claims priority under 35 U.S.C. § 119(e) to U.S. Provisional Patent Application Ser. No. 60/223,844, filed Aug. 8, 2000, of Noyes, et al., for CONTROL VALVES, both of which applications are incorporated herein by reference.

BACKGROUND OF THE INVENTION

The present invention relates to control valves, and more particularly to control valves and actuator devices for operation of the control valves. Even more particularly, the present invention relates to control valves and actuators for use in ultra pure applications.

The need for high purity chemical handling equipment is well established in the semiconductor industry. The degree to which a control valve, also referred to as a valve, is a high purity valve is measured by the contamination that it contributes to a gas or liquid stream that passes through the control valve. The difference in chemical content between what enters the valve and what leaves the valve is contamination, which may be either in a gas phase or fluid phase. There are essentially three sources of contamination associated with such valves.

First, the valve may leak atmospheric gas (e.g., air) into the liquid or gas stream (i.e., the material flow or the process flow), which is commonly referred to as an outboard leak. This is disadvantageous in that air, which contains about 1.5% moisture can contaminate the process flow. Typically, such outboard leaks occur due to actuation devices that allow the external environment access to the interior of the valve.

A second source of contamination is the valve may leak across a valve seat, which is commonly referred to as an inboard leak. This may lead to back streaming of other gases or fluids into a process gas or fluid or may lead to leakage of gas or fluid when it is not desired into a process, resulting in the presence of an otherwise desired chemical at the wrong time. Valves commonly leak across the valve seat due to a mis-alignment of a valve head-member and the valve seat or due to wear of the valve seat and the valve head-member or decomposition of particle matter on the valve seat.

A third source of contamination is the valve material itself may degrade and enter the gas or fluid stream. Valve components that are made of metal may degrade and contribute metallic contamination. Valve components made of elastomeric materials may degrade and contribute this as contamination. Such types of degradation may be further enhanced by the corrosive nature of the gas or liquid stream passing through the valve. Thus a high purity control valve is needed that minimizes these sources of contamination.

The present invention advantageously addresses the above and other needs.

SUMMARY OF THE INVENTION

The present invention advantageously addresses the needs above as well as other needs by providing a self-aligning, compact valve assembly for use in ultra pure applications which minimizes various sources of contamination over a wide temperature range.

In one embodiment, the invention can be characterized as a shut-off valve assembly including a hollow valve body having a first opening and a second opening, a valve seat positioned within the hollow valve body proximate to the first opening, and a first diaphragm assembly. A deflectable portion of the first diaphragm assembly is attached to an interior surface of the hollow valve body forming a first volume between the valve seat and the first diaphragm assembly. A second diaphragm is attached to another portion of the interior of the hollow valve body and attached to the first diaphragm assembly such that a second volume is defined between the second diaphragm and the second opening. A third volume is formed between the first diaphragm assembly and the second diaphragm and is sealed from the first volume and the second volume by the first diaphragm assembly and the second diaphragm. At least one flow hole is formed in the first diaphragm assembly and allows a process flow to flow between the first volume and the second volume. A self-aligning head assembly is also included which comprises a stem attached at a first end to another portion of the first diaphragm assembly and a valve head coupled to a second end of the stem. The valve head is adapted to self-align into the valve seat with a leak rate of less than or equal to $4\times10^{-9}$ atmosphere cc of Helium/sec. And a deflection of the deflectable portion of the first diaphragm assembly and the second diaphragm allows the other portion of first diaphragm assembly to move in order to open and close the valve head from the valve seat.

In another embodiment, the invention may be characterized as a valve assembly comprising a hollow valve body having a first opening and a second opening, a valve seat positioned within the hollow valve body, and a first diaphragm assembly having a ring portion and a sleeve portion. A perimeter of the ring portion is attached to an interior surface of the hollow valve body such that a first volume is defined between the valve seat and the first diaphragm assembly. A second diaphragm is attached at a perimeter surface to the another portion of the interior of the hollow valve body and attached to the sleeve portion such that a second volume is defined between the second diaphragm and the second opening. A third volume is formed between the first diaphragm assembly and the second diaphragm and is sealed from the first volume and the second volume by the first diaphragm assembly and the second diaphragm. At least one flow hole is formed in the sleeve portion and allows a process flow to flow between the first volume and the second volume. A self-aligning head assembly is also included and comprises a stem coupled at one end to the first diaphragm assembly and a valve head coupled to another end of the stem. The valve head is adapted to self-align into the valve seat. And an actuator assembly is coupled to the first diaphragm assembly and the second diaphragm for deflecting the ring portion of the first diaphragm assembly and the second diaphragm which moves the sleeve portion and which controls the position of the valve head relative to the valve seat.

In a further embodiment, the invention may be characterized as a valve assembly comprising a hollow valve body having a first opening at one end of the hollow valve body and a second opening at an opposite end of the hollow valve body. A valve seat is positioned within the hollow valve body. Also included is a first diaphragm assembly having a ring portion and a sleeve portion. The perimeter of the ring portion is attached to an interior surface of the hollow valve body such that a first volume is defined between the valve seat and the first diaphragm assembly. A second diaphragm is attached to the another portion of the interior of the hollow valve body and attached to the sleeve portion of the first diaphragm assembly such that a second volume is defined between the second diaphragm and the second opening. A third volume is formed between the first diaphragm assembly and the second diaphragm and is sealed from the first volume and the second volume by the first diaphragm assembly and the second diaphragm. At least one flow hole is formed in the sleeve portion, and allows a process flow to flow between the first volume and the second volume. A valve head is coupled to the sleeve portion and is adapted to seal into the valve seat. An actuator assembly is coupled to the first diaphragm assembly and the second diaphragm for deflecting the ring portion of the first diaphragm assembly and the second diaphragm which moves the sleeve portion and which controls the position of the valve head relative to the valve seat. A surface area of the ring portion facing the first volume is approximately equal to a surface area of the second diaphragm facing the second volume, such that a first force exerted on the ring portion by the process flow in the first volume substantially cancels a second force in the opposite direction exerted on the second diaphragm by the process flow in the second volume. Thus, the first diaphragm assembly and the second diaphragm are substantially balanced with respect to the pressure of the process flow.

In yet another embodiment, the invention may be characterized as a valve assembly comprising a hollow valve body having a first opening at one end of the hollow valve body and a second opening at an opposite end of the hollow valve body, and a valve seat positioned within the hollow valve body proximate to the first opening. Also included is a first diaphragm assembly having a ring portion and a sleeve portion extending away from the ring portion. A perimeter of the ring portion is attached to an interior surface of the hollow valve body such that a first volume is defined between the valve seat, the sleeve portion and the first diaphragm assembly. A second diaphragm is attached at a perimeter surface to the another portion of the interior of the hollow valve body. The second diaphragm includes a hole, wherein an end portion of the sleeve portion extends through the hole and the second diaphragm is attached to the sleeve portion at the hole. A second volume is defined between the second diaphragm, the end portion of the sleeve portion and the second opening. A non-gas wetted volume is formed between the first diaphragm assembly and the second diaphragm and is sealed from the first volume and the second volume by the first diaphragm assembly and the second diaphragm. At least one flow hole is formed in the end portion of the sleeve portion and allows a process flow to flow between the first volume and the second volume. Also included is a self-aligning head assembly comprising a flexible stem coupled at one end to the sleeve portion and a valve head coupled to another end of the flexible stem. At least a portion of the valve head is spherical and is adapted to self-align and seal into the valve seat with a leak rate of less than or equal to $4 \times 10^{-9}$ atmosphere cc of Helium/sec at temperatures up to 1000 degrees centigrade. An actuator assembly is coupled to the first diaphragm assembly and the second diaphragm for deflecting the ring portion of the first diaphragm assembly and the second diaphragm which moves the sleeve portion in order to open and close the valve head from the valve seat. The actuator assembly provides an actuating force axial to the movement of the process flow through the hollow valve body. Also, the process flow generally flows in-line through the hollow valve body between the first opening and the second opening via the first volume and the second volume. A surface area of the ring portion facing the first volume is approximately equal to a surface area of the second diaphragm facing the second volume, such that a first force exerted on the ring portion by the process flow in the first volume substantially cancels a second force in the opposite direction exerted on the second diaphragm by the process flow in the second volume. Thus, the first diaphragm assembly and the second diaphragm are substantially balanced with respect to the pressure of the process flow.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
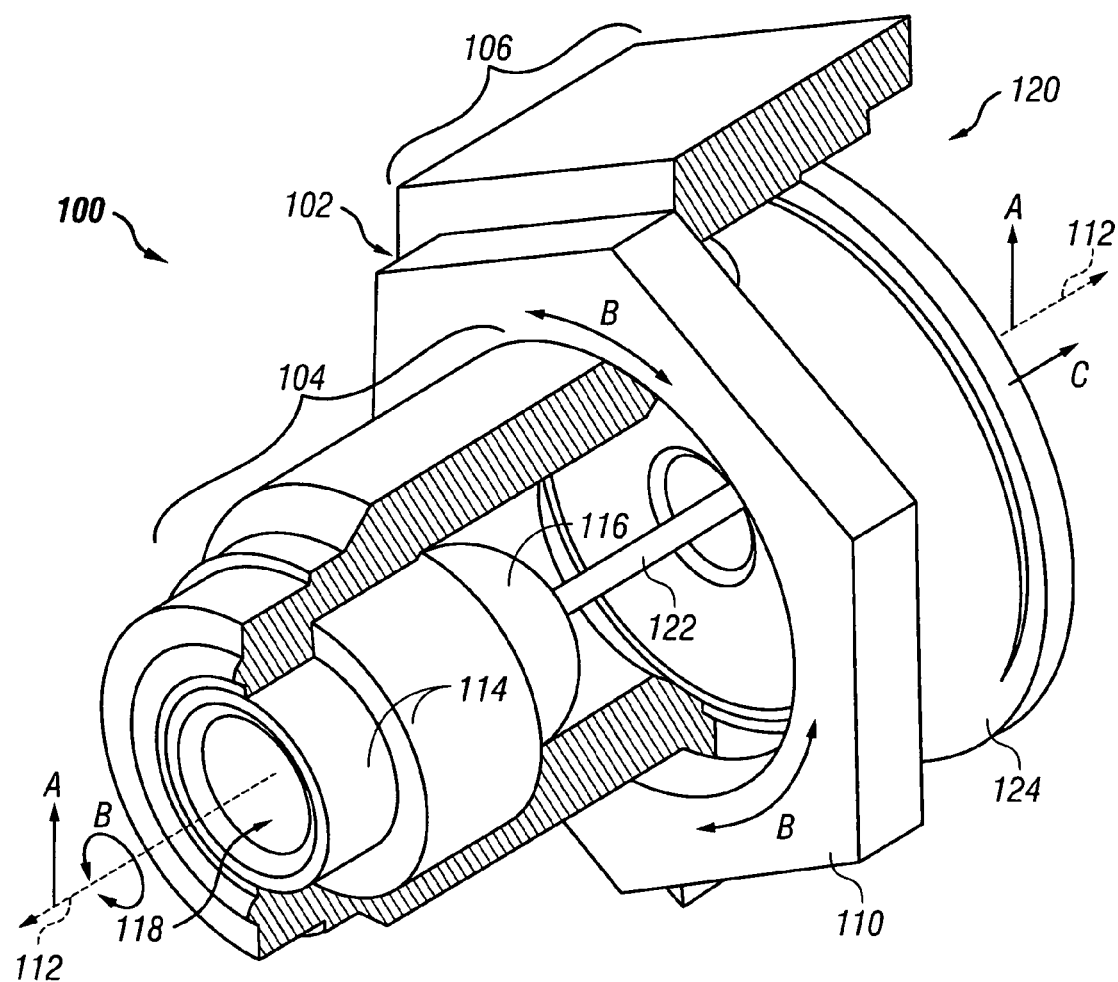
FIG. 1 is a perspective, partial cross sectional view of a valve assembly in accordance with one embodiment of the present invention.

Referring first to FIG. 1, a perspective, partial cross sectional view is shown of a valve assembly in accordance with one embodiment of the present invention. Shown is the valve assembly 100 including a housing 102 (referred to generically as a "hollow valve body") having a neck portion 104, a body portion 106, a first opening 118 and a second opening 120. Also shown is an actuator 110 (also referred to as an actuator ring), a central axis 112 passing through the center of the valve assembly 100, a seat assembly 114, a poppet 116 (also referred to generically as a "valve head" or a "valve gate member"), a stem 122 and a primary diaphragm 124 (also referred to as a deflectable diaphragm).

As illustrated, the valve assembly 100 is an in-line valve that is designed to be used as a shut-off valve, a proportional valve, and a critical flow nozzle, for example, as will be described below. The valve assembly 100 is located in between connecting devices and is designed to control the flow of materials therebetween. The valve assembly 100 may also be used to control the flow by turning the actuator as is described below; thus, replacing a needle valve.

Figure 2A:
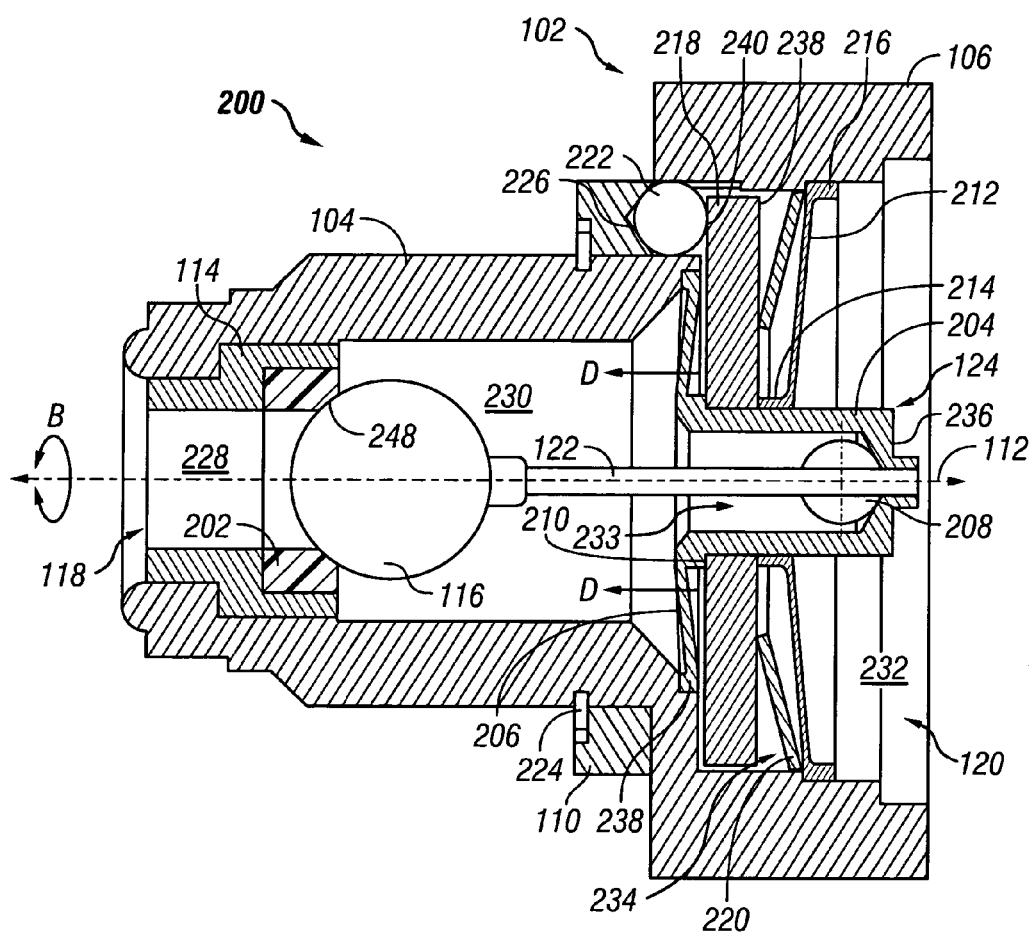
FIG. 2A is a cut-away side view of the valve assembly of FIG. 1 taken along the plane of arrows A and A' and having a mechanical actuator and illustrated in a "closed" position in accordance with one embodiment of the invention.
Figure 2B:
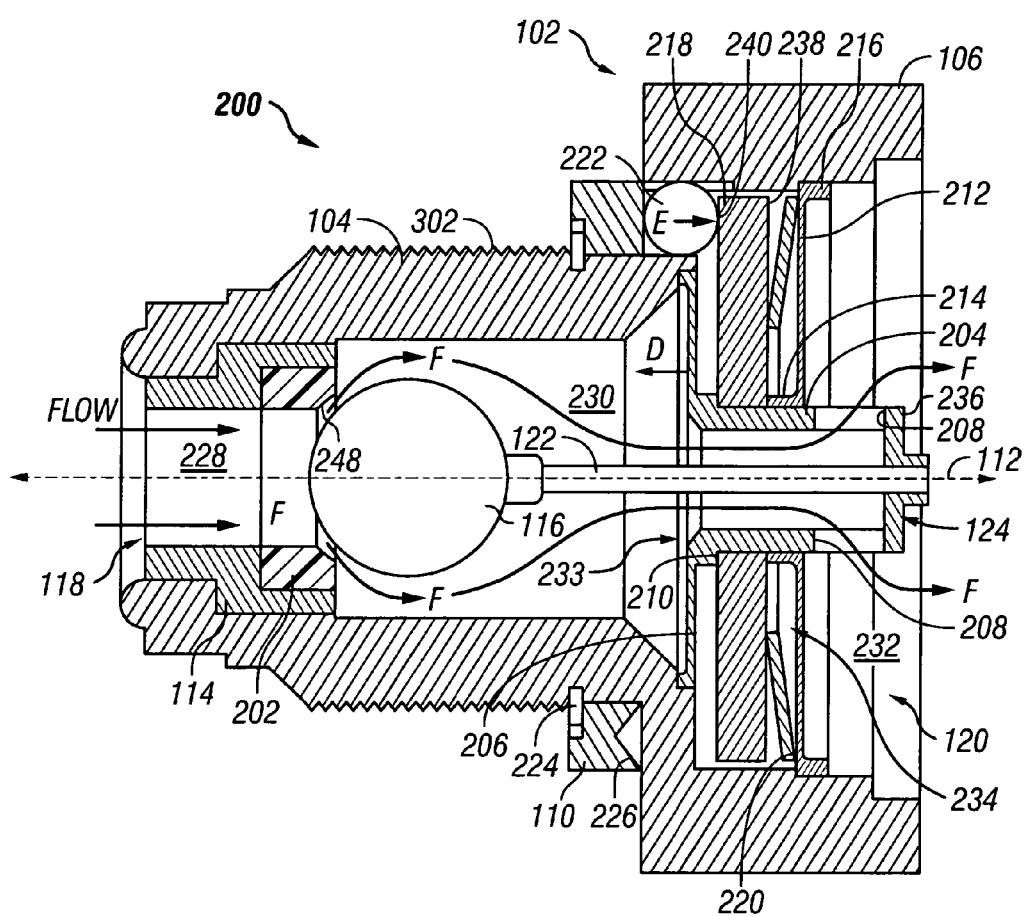
FIG. 2B is a cut-away side view of the valve assembly of FIG. 2A taken along the plane of arrows A and A' of FIG. 1 illustrating an "open" position and the flow of materials therethrough in accordance with one embodiment of the invention.

In the embodiment shown, the exterior surface of the neck portion 104 of the housing 102 is smooth such that connecting devices may be welded or compression fit to the neck portion 104. Alternatively, in other embodiments, the neck portion 104 includes external threads (not shown, but are illustrated in FIG. 2B) to threadably attach the valve assembly 100 to another device, for example, a connection to a Vacuum Coupling Radlow (also referred to as a VCR). A VCR is a metal gasket face seal which is a standard sealing mechanism known in the art. Additionally, the valve assembly 100 may be attached through a compression fitting via swaging, such as utilized in Swagelok fittings, produced by Swagelok Co., of Solon, Ohio, USA.

Note that the body portion 106 has a hexagonal exterior dimension, although the exterior dimension may be cylindrical or other shape that fits the desired application.

Thus, the neck portion 104 having the first opening 118 is connected in line and the body portion 106 having the second opening 120 is also connected in line, such that process materials flow through the valve assembly 100 along the central axis 112. In preferred embodiments, the flow of materials, e.g., gas, liquid, and slurry, also referred to as a "process flow", generally flows through the valve assembly 100 entering the valve assembly 100 via the first opening 118 (i.e., a valve inlet) and exiting the valve assembly 100 via the second opening 120 (i.e., a valve outlet). Alternatively, the direction of the process flow may be from the second opening 120 to the first opening 118 such that the second opening 120 is the valve inlet and the first opening 118 is the valve outlet.

As will be described in further detail below, the valve assembly 100 is a mechanically simple design that may use a variety of means to actuate the seal within. For example, within the valve assembly 100, the poppet 116 seals against a valve seat of the seat assembly 114. The actuator assembly, including the actuator 110, opens and closes (unseals and seals the poppet 116 from the seat assembly 114) the valve assembly 100, thus, controlling the flow therethrough. In the embodiment of FIG. 1, the actuator 110, which is a mechanical actuator assembly in the form of a rotatable hexagonal nut, controls the operation of the actuator assembly. The actuator 110 is simply rotated (along Arrow B relative to the stationary housing 102) which causes the primary diaphragm 124 to move in the direction of Arrow C, i.e., the primary diaphragm 124 is caused to deflect in the direction of Arrow C. The poppet 116 is attached to the primary diaphragm 124 via the stem 122, which is attached to the primary diaphragm 124. Thus, when the primary diaphragm 124 moves in the direction of Arrow C, the poppet 116 is unsealed from the seat assembly 114. This embodiment is advantageously designed such that a very small actuation force is required to open or close the valve assembly 100. FIGS. 2A and 2B better illustrate the internal components of the valve assembly 100. Other types of actuator assemblies include electromagnetic, piezoelectric, pneumatic and hydraulic actuator assemblies, which are described further throughout the specification.

It is noted that together the poppet 116 and the stem 122 are one embodiment of a "self-aligning head assembly". A self aligning head assembly is a structure by which a valve head or valve seal (e.g., the poppet 116) is allowed to seal against the sealing surface of the seat assembly 114 in such a manner that the valve head or seal "self aligns" into the sealing surface of the seat assembly 114. In a preferred embodiment, this is allowed because at least a portion of the poppet 116 is spherical and the stem has a desired flexibility. Similarly, other shaped poppets may be used to self align against the sealing surface, e.g., ellipsoid or conical shapes. Other embodiments provide a floating poppet whose position is controlled relative to the seat assembly via a poppet retainer (see FIGS. 16 and 17).

Additionally, as will be described, the valve assembly 100 is comprised of materials that enable the valve assembly 100 to be used in high temperature applications, corrosive environments, and ultrapure applications.

Furthermore, the valve assembly 100 is specifically designed to minimize three main types of contamination common to conventional valve systems. Thus, the valve assembly minimizes (1) "outboard leaks" in which the outside atmosphere leaks into the valve assembly, (2) "inboard leaks" in which the process flow leaks over the seat assembly 114 and the poppet 116 due to an improper seal, and (3) contamination due to degradation or corrosion of valve components.

Referring next to FIG. 2A, a cut-away side view of the valve assembly of FIG. 1 is shown taken along the plane of arrows A and A' (in FIG. 1) and having a mechanical actuator and illustrated in a "closed" position in accordance with one embodiment of the invention. Shown are the valve assembly 200 having a housing 102 (referred to generically as a "hollow valve body") including a neck portion 104, a body portion 106, a first opening 118 and a second opening 120. Also shown are a seat assembly 114 including a valve seat 202, a poppet 116 (referred to generically as a valve head or valve gate member) and a stem 122. The poppet 116 and the stem 122 are one embodiment of a self-aligning head assembly. A diaphragm assembly includes a primary diaphragm 124 (also referred to as a primary diaphragm assembly) including a sleeve portion 204, a ring portion 206 (also referred to generically as a "deflectable portion"), at least one flow hole 208, and an edge 210. The diaphragm assembly also includes a secondary diaphragm 212 including an inner lip 214 and an outer lip 216. The diaphragm assembly may be referred to as a deflectable diaphragm assembly. Also included is an actuator assembly including a washer 218, a spring 220, at least one actuator ball 222, an actuator 110 and a retaining ring 224. The actuator 110 includes a detent 226 corresponding to each actuator ball 222. Also shown is a central axis 112, an upstream volume 228, an intermediate volume 230, a downstream volume 232 and a non-gas wetted volume 234 (also referred to as a free flow volume). The upstream volume 228, the intermediate volume 230 and the downstream volume 232 may all be referred to collectively as a "flow volume" since the process flow is designed to flow through these respective volumes.

The valve assembly 200 shown is designed to be a mechanically simple valve that may be used as a a shut off valve, a proportional valve, and a critical flow nozzle. The valve assembly 200 uses a structurally simple actuator assembly to cause the poppet 116 to seal and unseal from the valve seat 202 of the seat assembly 114. Furthermore, the valve assembly 200 is a space conscious in-line system that may be coupled to other devices, such as process gas containers, VCR, tube attachments, gas cylinders, liquid canisters, etc. The valve assembly 200 may be made of selected materials in order to use in many applications, such as high temperature applications, ultra-pure applications (e.g., semiconductor processing), and aerospace applications.

The housing 102 of the valve assembly 200 is designed to connect devices together for passing a process gas, fluid, or slurry, also referred to as a "process flow" therethrough. The process flow may be 2-phase, i.e., includes solid and liquid, or 3-phase, i.e., includes solid, liquid and gas. In the embodiment shown, the housing 102 is hexagonally shaped and includes a neck portion 104 and a body portion 106. The neck portion 104 is a smooth cylindrical shape such that connecting devices are welded to the neck portion 104, for example. Alternatively, the neck portion 104 includes exterior threads on the exterior surface for a threaded connection to another device. An example of a threaded neck portion is illustrated in FIG. 2B. The neck portion 104 may be constructed to standard dimensions to allow easy interconnection to standard size devices.

The housing 102 is hollow such that a volume is formed within that the process flow passes through. The seat assembly 114 is positioned within the housing 102 near the first opening 118. The seat assembly 114 is a cylindrical portion that fits flush against the interior surface of the neck portion 104. The seat assembly 114 includes the valve seat 202, which is a ring shaped component where the process flow is sealed and unsealed between the valve seat 202 and the poppet 116. Thus, the valve seat 202 has a circular opening having a diameter smaller than the inner diameter of the neck portion 104 at the first opening 118.

A diaphragm assembly is positioned within the valve body 102 and is coupled to the actuator assembly for controlling the position of the poppet 116 relative to the valve seat 202. The diaphragm assembly separates the flow volumes, i.e., the intermediate volume 230 and the downstream volume 232 from the non-gas wetted volume 234 which contains the components of the actuator assembly.

The diaphragm assembly includes the primary diaphragm 124, which is positioned within the interior of the housing 102 such that it is attached to the interior surface of the housing 102, typically near the junction of the neck portion 104 and the body portion 106. The primary diaphragm 124 includes a ring portion 206 which is generally "washer" shaped having an outer diameter and an inner diameter. The primary diaphragm 124 also includes a sleeve portion 204 that extends from near the inner diameter of the ring portion 206 in a direction along a central axis 112 of the valve assembly 200 toward the second opening 120. The sleeve portion 204 is generally cylindrically shaped having an open end 233 (at the inner diameter of the ring portion 204) and a closed end 236 (at the end of the sleeve portion 204 extending toward the second opening 120). In some embodiments, the primary diaphragm 124 is one integral component including both the sleeve portion 204 and the ring portion 206. In alternate embodiments, the sleeve portion 204 and the ring portion 206 are separate components of the primary diaphragm 124. In such alternate embodiments, the ring portion 206 is a ring or washer shaped diaphragm that is welded, or otherwise attached, to the open end 233 of the sleeve portion 204.

The sleeve portion 204 further includes at least one flow hole 208 at or near the closed end 236, e.g., typically formed near the back of the sleeve portion 204. The primary diaphragm 124 is attached to an interior surface of the housing 102 entirely about an outer edge 238 of the ring portion 206. For example, the outer edge 238 of the ring portion 206 is welded along an inner surface of the housing 102; thus, forming a seal between the outer edge 238 of the ring portion 206 and the inner surface of the housing 102. Alternatively, the outer edge 238 of the ring portion 206 may be attached to the inner surface of the housing 102 via crush nuts, as are known in the art.

A stem 122 is attached, e.g., welded, at one end to the closed end 236 of the sleeve portion 204 of the primary diaphragm 124. The stem 122 extends from the closed end 236 of the sleeve portion 204 out of the primary diaphragm 124 through the open end 233 of the sleeve portion 204 and toward the valve seat 202. In the embodiment shown, the stem 122 only contacts the primary diaphragm 124 at the closed end 236 of the sleeve portion 204. The poppet 116 is attached at an opposite end of the stem 122. The poppet 116 is designed to seal into and out of the valve seat 202. In a preferred embodiment, the poppet 116 is a spherical poppet, e.g., a ball, such that the poppet 116 will align easily within the circular opening of the valve seat 202, which includes an angled edge 248 designed to interface with the spherical poppet. In other embodiments, the poppet 116 is not limited to ball-shaped poppets. Furthermore, the poppet 116 may be ball-shaped at only a portion of the poppet 116, e.g., the portion of the poppet 116 that interfaces with the valve seat 202 is rounded or spherical, while the portion that does not interface with the valve seat 202, i.e., the portion coupled to the stem 122, may be block shaped, for example. The poppet 116 may also be conically shaped. Additionally, in preferred embodiments, the poppet is rigid, i.e., non-deformable.

Advantageously, in preferred embodiments, the stem 122 is made of a flexible material, designed to have elastic characteristics, or had dimensions providing a flexibility to the stem 122. For example, the stem 122 is made of various grades of stainless steel or HASTELLOY™ and is relatively long in comparison to its thickness. HASTELLOY™ is a material commercially available by Haynes International located in Anaheim, Calif. Thus, as the poppet 116 is moved into the valve seat 202 (due to movement of the primary diaphragm 124 as described below), the poppet 116 "self aligns" into the valve seat 202 due to the flexibility of the stem 122. Note that since the thickness of the stem 122 is small relative to the length of the stem 122 from the poppet 116 to the closed end 236 of the sleeve portion 204, that the stem 122 will naturally flex, unless the stem 122 is made of a very rigid material. In contrast, conventional approaches do not employ a stem, but a rigid connection to the poppet, or employ a rigid stem that has a thickness that is not small relative to length of the stem, or a non-flexible poppet assembly. These conventional approaches may disadvantageously allow the poppet to un-align itself with respect to the valve seat over time. This may be due to physical degradation of the valve components, mechanical failure, warping of valve components, etc. Thus, if the stem were entirely rigid and the alignment was not perfect, the seal between the poppet and the valve seat may be compromised. Thus, inboard leaks between the valve seat and the poppet may occur which may introduce an otherwise desired process flow through the valve at an undesired time.

In contrast, since the stem 122 is flexible, and is long in comparison to its thickness, even if the stem 122 is not perfectly aligned with the central axis 112 of the housing 102, i.e., or other wise aligned with the valve seat 202, the poppet 116 will initially be pushed into the valve seat 202 off-center, but as the stem 122 continues to push against the poppet 116, the stem 122 slightly gives and allows the poppet 116 to self align into the valve seat 202. Furthermore, the spherical shape of the poppet 116 and the angled edge 248 of the valve seat 202 assist in the self-aligning. Advantageously, this type of poppet 116 and stem 122 reduces inboard leaks, since the poppet 116 is able to self-align within the valve seat 202 for a very effective seal. Furthermore, the self-aligning feature eases manufacturing standards since the stem 122 and poppet 116 are not required to be perfectly aligned with the valve seat 202.

Thus, the poppet 116 and the stem 122 represent an embodiment of a "self-aligning head assembly", in which the valve head or valve seal (e.g., poppet 116) is able to seal against the sealing surface of the valve seat 202 in a self-aligning manner. In other embodiments, a floating poppet (i.e., not attached to a stem) is held in between a poppet retainer and the valve seat and the poppet retainer is moved to position the floating poppet into the valve seat 202 (see FIGS. 16 and 17, for example). Note that the "self-aligning head assembly" is attached to the primary diaphragm 124, e.g., at the closed end 236 of the sleeve portion 204.

The diaphragm assembly further includes a secondary diaphragm 212 which is attached, e.g., welded, to both the interior of the body portion 106 and the exterior of the sleeve portion 204 of the primary diaphragm 124. The secondary diaphragm 212 is also ring or washer shaped having an outer diameter and a hole defined at an inner diameter. The secondary diaphragm 212 is attached to the interior of the body portion 106 at an outer lip 216 (e.g., by welding or crush nuts) formed annularly about the secondary diaphragm 212, while the secondary diaphragm 212 is attached to the exterior of the sleeve portion 204 at an inner lip 214 formed annularly about the secondary diaphragm 212 at its inner diameter. The inner lip 214 of the secondary diaphragm 212 attaches about an exterior portion of the sleeve portion 204 on the upstream side of the flow holes 208. Thus, at least a portion of the sleeve portion 204 extends through the hole in the secondary diaphragm 212.

By sealing the secondary diaphragm 212 to both the interior of the body portion 106 and the sleeve portion 204, a non-gas wetted volume 234 is created between the ring portion 206, the secondary diaphragm 212, the portion of the sleeve portion 204 in between the ring portion 206 and the secondary diaphragm 212, and the interior of the body portion 106 between the ring portion 206 and the secondary diaphragm 212. This non-gas wetted volume 234 is effectively sealed from the upstream volume 228, the intermediate volume 230 and the downstream volume 232 such that the process flow can not leak into the non-gas wetted volume 234. The non-gas wetted volume 234 typically contains the actuator assembly or at least contains portions of the actuator assembly.

The primary diaphragm 124 and the secondary diaphragm 212 are preferably made out of a stainless steel, HASTELLOY™, ELGILOY™, or other metals and ceramics. Note that the secondary diaphragm 212 is welded to the primary diaphragm 124 and, although described as two separate components, the primary diaphragm 124 and the secondary diaphragm 212 may be one unitary diaphragm body.

In the embodiment of FIG. 2A, the actuator assembly comprises a mechanical assembly including the washer 218, the spring 220, at least one actuator ball 222 (also referred to as an actuator member), the retaining ring 224 and the actuator 110 including at least one detent 226. The washer 218 is positioned within the non-gas wetted volume 234 and surrounds a portion of the exterior surface of the sleeve portion 204. The washer 218 is not attached to the sleeve portion 204, nor attached to the interior of the body portion 106. The washer 218 is positioned between the at least one actuator ball 222 and the secondary diaphragm 212. The washer 218 contacts the secondary diaphragm 212 at the inner lip 214 attached to the exterior surface of the sleeve portion 204, although the washer 218 is not attached to the outer lip 216 of the secondary diaphragm 212.

A spring 220, which is a conical spring washer or spring washer, e.g., a bellevue spring washer, is positioned between the outer lip 216 of the secondary diaphragm 212 (which is attached to the interior surface of the body portion) and the downstream side 238 of the washer. The actuator balls 222 are held within openings in the body portion 106 between the actuator detents 226 and an upstream side 240 of the washer. The actuator 110 is a ring structure that extends annularly about an exterior surface of the neck portion 104 at the base of the body portion 106. The actuator 110 typically has a circular opening slightly larger than the exterior diameter of the neck portion 104 and a hexagonal shaped outer dimension (see FIG. 1) to allow for a user to easily rotate the actuator 110. Thus, the actuator 110 is designed to be rotated axially about the central axis 112 by a user in a direction shown by arrow B. The retaining ring 224 holds the actuator 110 in place about the neck portion 104.

Furthermore, detents 226 are formed in the surface of the actuator 110 that covers the openings into the body portion 106. Note that only one actuator ball 222 and only one detent 226 is shown in FIG. 2A; however, preferably there are three or four actuator balls 222 and matching detents 226 equally spaced about the actuator 110.

In a closed position, i.e., the poppet 116 is sealed into the valve seat 202 in a self-aligning manner, preventing the process flow from moving, each actuator ball 222 sits within a respective detent 226 in the actuator 110. Each ball 222 is held within the detent 226 by contact from the upstream side 240 of the washer 218.

In operation, the spring 220 exerts force against the downstream side 238 of the washer 218 pushing it in the direction of Arrow D. This causes the washer 218 is push each ball 222 into the respective detent 226 as shown. Additionally, the upstream side 240 of the washer 218 contacts an edge 210 of the sleeve portion 204 of the primary diaphragm 124 near the open end 233 of the sleeve portion 204. It is important to note that although the ring portion 206 and the secondary diaphragm 212 are attached to the interior surface of the body portion 106, the primary diaphragm 124 and the secondary diaphragm 212 are made of a metallic substance that is flexible, so that the primary diaphragm 124 and the secondary diaphragm 212 may deflect slightly when pressure is applied. Furthermore, the ring portion 206 is much thinner than the sleeve portion 204; thus, the ring portion 206 is more flexible than the sleeve portion 204. Thus, the ring portion 206 and the secondary diaphragm 212 are allowed to deflect together along the central axis 112. This allows movement of the sleeve portion 204 along the central axis 112 of the housing 102, which causes the stem 122 and poppet 116 to move along the central axis 112 (sealing and unsealing the poppet 116 from the valve seat 202). Thus, since the washer 218 is forced in the direction of Arrow D (by the force exerted on the downstream side 238 of the washer 218 by the spring 220 pushing against the outer lip 216 of the secondary diaphragm 212), upstream side 240 of the washer 218 pushes the sleeve portion 204 (due to its contact with the sleeve portion 204 at edge 210) the sleeve portion 204 is held in a position such that the poppet 116 is fully inserted into the valve seat 202. In this embodiment, this position is referred to as a "normally closed" position.

Referring next to FIG. 2B, a cut-away side view of the valve assembly of FIG. 2A is shown taken along the plane of arrows A and A' of FIG. 1 illustrating an open position and the flow of materials therethrough in accordance with one embodiment of the invention. The valve assembly 200 of FIG. 2B includes the same components and arrangement as shown in FIG. 2A, except that the neck portion 104 includes threads 302 for connection to other devices. Note however that in order to better illustrate the flow holes 208 in the sleeve portion 204, the sleeve portion 204 is illustrated as being rotated 45 degrees axially about the central axis 112. Note that the remainder of the valve assembly 200 remains at the same orientation as shown in FIG. 2A, in order to illustrate the movement of the actuator assembly which results an opening of the valve assembly 200.

To open the valve assembly 200 and allow the process flow to pass therethrough, the actuator 110 is rotated about annularly about the neck portion 104. This rotation moves the detents 226 from under each ball 222 such that each ball 222 is forced by the actuator 110 in the direction indicated by Arrow E. The movement of each ball 222 in the direction of Arrow E applies a force to the upstream side 240 of the washer 218 in the direction of Arrow E. This force is greater than the force exerted by the spring 220 in the opposite direction on the washer 218. Thus, the washer 218 is forced to move along the central axis 112 in the direction of arrow E. Furthermore, since the washer 218 contacts the secondary diaphragm 212 at the inner lip 214 of the second secondary diaphragm 212 attached to the sleeve portion 204, the washer 218 applies a force at the inner lip 214. Since the ring portion 206 of the primary diaphragm 124 and the secondary diaphragm 212 are made of a flexible metallic material, both the ring portion 206 and the secondary diaphragm 212 deflect in the direction of the Arrow E, causing the washer 218 to effectively move the entire sleeve portion 204 in the direction of Arrow E. As such, the stem 122 and poppet 116 attached thereto also move in the direction of Arrow E, which "unseals" the poppet 116 from the valve seat 202. Note that the detents 226 in the actuator 110 have simply been rotated away from the balls 226. FIG. 2B illustrates the positioning of one detent 226 while the valve assembly 200 is in the open position.

In the open position, the process flow moves through the valve assembly 200 as shown by Arrows F. The process flow (e.g., gas, fluid, slurry), moves into the first opening 118 of the housing 102, through the upstream volume 228, in between the valve seat 202 and the poppet 116, through the intermediate volume 230, through the open end 233 of the sleeve portion 204, through the length of the sleeve portion 204, out through the flow holes 208, and exits through the second opening 120 via the downstream volume 232. Thus, the process flow flows through the upstream volume 228, the intermediate volume 230 and the downstream volume 232, but not through the non-gas wetted volume 234.

Additionally, this embodiment of the valve assembly 200 reduces a source of contamination known as an "outboard leak". An outboard leak is where atmosphere (e.g., air) leaks into the valve assembly 200 introducing air and moisture into the process flow. Such outboard leaks might typically occur at locations, such as between the actuator 110 and the openings into body portion 106. However, such outboard leaks are prevented by the embodiments as shown in FIGS. 2A and 2B because the non-gas wetted volume 234 is sealed from both the downstream volume 232 and the intermediate volume 230 by the ring portion 206 of the primary diaphragm 124, the secondary diaphragm 212 and the sleeve portion 204 of the primary diaphragm 124. Thus, any atmosphere entering into the non-gas wetted volume 234 via the openings is prevented from entering the flow volumes of the valve assembly 200. Thus, advantageously, outboard leaks are reduced.

Figure 3:
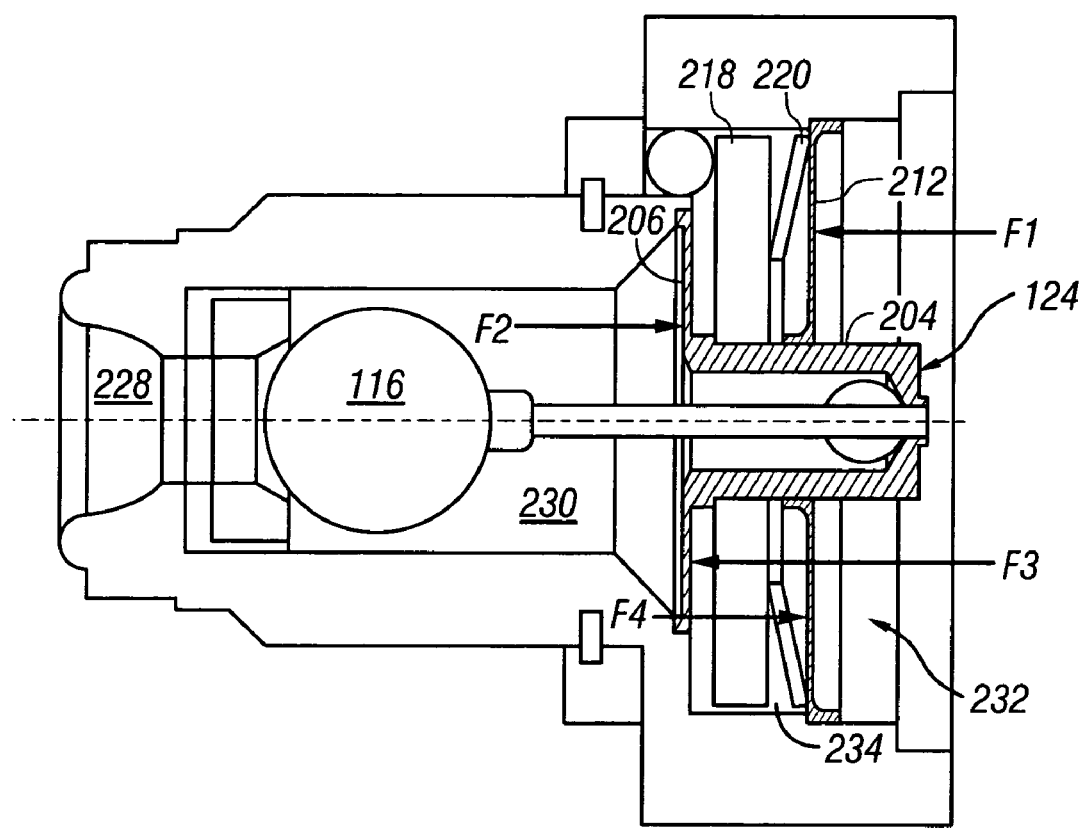
FIG. 3 is a cut-away side view of the valve assembly of FIGS. 2A and 2B illustrating a free force diagram of the forces exerted on the components of a diaphragm assembly within the valve assembly.

Furthermore, advantageously, only a small actuation force is required to open the valve assembly, which is illustrated in FIG. 3. Referring briefly to FIG. 3, a cut-away side view is shown of the valve assembly of FIGS. 2A and 2B illustrating a free force diagram of the forces F1, F2, F3 and F4 exerted on the components of the diaphragm assembly 124 and the secondary diaphragm 212 within the valve assembly. The side of the ring portion 206 facing the non-gas wetted volume 234 is at atmospheric pressure, while the side of the ring portion 206 facing the intermediate volume 230 is at the working process (e.g., fluid) pressure. Additionally, the side of the secondary diaphragm 212 facing the downstream volume 232 is exposed to approximately the same working pressure as the side of the ring portion 206 facing the intermediate volume 230; however, in the opposite direction as the working pressure against the ring portion 206. And the side of the secondary diaphragm 212 exposed to the non-gas wetted volume 234 is also at atmospheric pressure.

As such, the force F2 on the primary diaphragm 124, e.g., mainly on the ring portion 206, (i.e., in the direction of Arrow E of FIG. 2B) is the fluid working pressure (P) times the area (A) of the primary diaphragm 124 exposed to the working fluid (where generally F=PA). The force F1 on the secondary diaphragm 212 (i.e., in the direction of Arrow D of FIGS. 2A and 2B) is also equal to the working fluid pressure (P) times the area (A) of the secondary diaphragm 212 exposed to the working fluid. Note that since both pressures are in opposite directions, they cancel each other. As such, the overall differential force applied by the process flow is the working pressure times the difference in the surface areas of the primary diaphragm 124 (primarily the ring portion 206) and the secondary diaphragm 212 exposed to the working fluid. As such, even though the pressure exerted by the process flow is great, i.e., F1 and F2 may be thousands of psi, the pressure on both sides of the primary diaphragm 124 and the secondary diaphragm 212 works against each other. Thus, the differential force is |F1−F2|. According to one embodiment, the surface areas of the portions of the primary diaphragm 124 and the secondary diaphragm 212 exposed to the working fluid are nearly the same size, they closely balance each other. Thus, the differential force is minimal. In other words, there is only a very small area of the primary diaphragm 124 that is subject to a pressure differential.

It is noted that the illustration of FIG. 3 is not completely to scale. Thus, the surface area of the ring portion 206 and the secondary diaphragm 212 are designed to be about the same, even though it appears as though the surface area of the secondary diaphragm 212 is greater than the surface area of the ring portion 206 in FIG. 3. It is also understood that one of ordinary skill in the art could vary the dimensions of the various components such that the ring portion 206 and the secondary diaphragm 212 are designed to have almost exactly the same surface areas, for example, the outer lip 216 of the secondary diaphragm 212 could be made thicker or the thickness of the body portion 106 could be greater at the point of attachment to the secondary diaphragm 212.

Additionally, the force F3 on the surface of the ring portion 206 of the primary diaphragm 124 facing the non-gas wetted volume 234 is equal to the atmospheric pressure times the area of the ring portion 206 exposed to the non-gas wetted volume 234. Force F4 is the atmospheric pressure times the area of the secondary diaphragm 212 exposed to the non-gas wetted volume 234. Again, the differential force is equal to the atmospheric pressure times the difference in the surface areas of the ring portion 206 and the secondary diaphragm 212 exposed to the non-gas wetted volume 234, i.e., equal to |F3−F4|. Again, according to one embodiment, the surface areas are nearly the same such that they balance each other and the differential force is minimal.

Thus, in some embodiments, the area of the diaphragm assembly exposed to the pressure in one direction can be designed approximately equal to the area of the diaphragm assembly in the opposite direction. Thus, the force exerted by the process flow and the atmosphere on the diaphragm assembly almost completely cancels out, i.e., the working pressure of the process flow does not need to be overcome by the actuating device in order to move the poppet 116. This is referred to as a "balanced" diaphragm assembly. Thus, since the force of the working fluid or process flow cancels, only a small actuation force is needed (e.g., on the spring 220) to overcome the overall differential force against the diaphragms.

This is in contrast to conventional valve assemblies in which the working pressure is only on one side of a conventional diaphragm. As such, there is no balancing pressure on the other side of the diaphragm of a conventional valve assembly, and an actuation force must be generated that is large enough to overcome the effective pressure exerted by the process flow itself. In known valve assemblies, the working fluid pressure may be anywhere from a few psi to a few thousand psi. For example, in order to move a conventional diaphragm, a 1000 psi actuation force must be generated in order to overcome the force exerted on the diaphragm by the working fluid.

Thus, most of the force required to control the motion of the valve is due to the stiffness of the valve diaphragm assembly, e.g., the ring portion 206 and the secondary diaphragm 212, and the spring 220, not the working fluid. This enables accurate positioning of the valve with a low force actuator. Advantageously, this embodiment uses the working fluid on the opposite sides of the ring portion 206 and the secondary diaphragm 212, along with atmospheric pressure on the opposite sides of the ring portion 206 and the secondary diaphragm 212 to balance the fluid forces on the valve mechanism.

Usually, shut off valves require a large amount of force to stay shut, hence they are unusable as proportional valves. In one embodiment, this valve assembly 200 may be used as both a shut off valve and a proportional valve because, the amount of force required to lift the poppet 116 out of the valve seat 202 is minimal. This valve assembly 200 may therefore be actuated with a small force. This enables applications where power to generate such actuating forces is scarce, such as the power that might be available on a satellite for use with electric propulsion for station keeping.

Furthermore, since the non-gas wetted volume 234 is at atmospheric pressure, there is no internal pressure due to the process flow applied to the washer 218 or spring 220 within the non-gas wetted volume 234. Thus, the actuating mechanism is not subjected to the pressure of the process flow.

Referring back to FIGS. 2A and 2B, as configured, the process flow itself aids in opening the poppet 116, since as the washer 218 is caused to move in the direction of Arrow E, the process flow normally exerts a certain amount of pressure against the poppet 116 within the valve seat 202 since the process flow wants to flow through the valve assembly 200. Thus, the process flow actually helps push against the poppet 116 to aid in the opening of the valve assembly, i.e., the unsealing of the poppet 116 and the valve seat 202.

Additionally, the poppet 116 is only required to move a very small distance away from the valve seat 202 in order for the process flow to be desirable. In particular, in semiconductor gas applications, the poppet 116 is only required to move about 0.001–0.020 inches.

It is noted that the actuator assembly is a very simple design, that replaces complicated actuator designs. Furthermore, such valves may require a much greater actuation force. Additionally, the actuator assembly of this embodiment fits within the exterior dimension of the valve body, which is designed as an in-line connecting device. Conventional actuator devices are typically contained outside of the exterior dimension of the valve body or are actuated by a mechanical force produced out-of-line of (i.e., transverse to) the process flow and require a translation to an axial force along the central axis. Such valves further add to the thickness of a comparable body portion. Advantageously, the actuator assembly shown in FIGS. 2A and 2B requires a small actuation force and very efficiently provides a direct axial force (e.g., in the direction of the arrow E) that results in direct movement of the poppet 116 in the direction of arrow E.

To re-close the valve assembly 200, the actuator 110 is simply rotated until each ball 222 is repositioned within the detents 226. The force in the direction of Arrow E is removed, and the washer 218 is again moved back in the direction of Arrow D by the spring 220, which again, moves the poppet 116 in the direction of Arrow D to seal into the valve seat 202.

By providing a valve assembly 200 able to go from an open position to a closed position, a "shut off valve" is provided. And by the proper selection of valve components as discussed below, the shut-off valve will have a leak rate of less than $4\times10^{-9}$ atmospheric cc of Helium/sec, which is required in ultra pure applications, such as semiconductor processing.

Additionally, once the valve assembly 200 is in the open position, the valve assembly 200 may be used as a "proportional valve" in which the rate of the process flow is controlled by (1) varying the dimensions of the poppet 116 and corresponding valve seat 202, (2) varying the travel path of the poppet 116 in and out of the valve seat 202, and (3) varying the dimensions of the flow holes 208. Advantageously, in some embodiments, the valve assembly operates as a shut-off valve and a proportional valve.

By varying the dimensions of the poppet 116 and the valve seat 202, a smaller opening may be created through which a process flow may enter into the valve assembly 200. This will restrict the rate at which the process flow can pass through the valve assembly 200. By varying the travel of the poppet 116, e.g., by sizing the detents 226, balls 222, and flexibility of the ring portion 206 and the secondary diaphragm 212, the poppet 116 may be made to travel a further distance along the central axis 112 from closed to open position. Hence, the shorter the travel distance, the tighter the space between the poppet 116 and the valve seat 202, which will restrict the rate at which the process flow passes through the valve assembly 200. Furthermore, by altering the size of the flow holes 208, e.g., making the flow holes 208 very small, the rate at which the process flow passes through the valve assembly 200 is also restricted.

Furthermore, the valve assembly is operable as a valve in which the unsealing motion of the poppet 116 relative to the valve seat 202 is controlled, e.g., by the actuator. For example, the actuator 110 may have several detents 226 of differing depths formed therein such that the rate at which the process flow passes through the valve assembly is variable depending on which detent 226 the balls 222 rest within. This variably actuating embodiment is further described with reference to FIG. 6A. Additionally, the actuator 110 may be fitted with threads at its inner diameter, which correspond to threads on the exterior surface of the neck portion 104. The actuator 110 is simply threaded closer to the body portion, which effects the amount of force applied by the actuator on the respective balls 222. This embodiment does not require detents 226 and is further illustrated in FIG. 6B. This embodiment could easily replace a needle valve as known in the art. Conventional needle valves are incapable of functioning as a shut-off valve. This embodiment may function as both a shut-off valve and a valve in which the flow is controlled via the actuator.

Furthermore, the valve assembly is operable as a critical flow nozzle. For example, once the poppet 116 is unsealed from the valve seat, if the upstream pressure of the process flow is held above twice the downstream pressure, a critical flow is reached. Then the rate at which the process flow passes through the valve assembly, i.e., the process flow passes through the flow holes 208, is controllable by altering the upstream pressure.

The selection of valve components used affects the applications that the valve assembly 200 may be used. Another source of contamination is the valve material itself may degrade and enter the process flow. Valve components that are made of metal may degrade and contribute metallic contamination. Valve components made of elastomeric materials may degrade (particularly when exposed to high temperatures) and contribute this as contamination. Such types of material degradation are further enhanced by the corrosive nature of the process flow passing through the valve.

In preferred embodiments, the valve components are not made of elastomers. Since elastomers are hydrophilic, they have a tendency to absorb moisture, which may take hours to remove. Furthermore, elastomers allow certain types of gases to permeate through the elastomer material itself, causing "outgassing". Particularly important are the composition of the poppet 116 and the valve seat 202 since these components seal the valve assembly 200. Furthermore, stainless steel, and most metals will corrode in the presence of virtually any wet acid gas.

Thus, in preferred embodiments, the valve seat 202 and the poppet 116 are made of non-metallic crystalline structures, such as ruby, or ceramics, which provides an exemplary corrosion resistance seal. For example, the poppet 116 comprises a crystalline material such as ruby, e.g., crystalline $Al_2O_3$ (a synthetic ruby), and the valve seat 202 comprises a ceramic material, e.g., ceramic alumina or amorphous $Al_2O_3$, that are both impervious to corrosion by most semiconductor processing fluids (liquids, gasses or slurries). Alternatively, the valve seat 202 may be made of ruby or other suitable ceramics, glasses, quartz, zirconia oxide, or similar materials, such as silicon (e.g., silicon nitride and silicon carbide). Alternatively, the poppet 116 or valve seat 202 may be made of stainless steel, HASTEALLOY™ C22, as produced by Haynes International located in Anaheim, Calif. However, this stainless steel embodiment will not be as corrosion-resistant as a ruby or ceramic material. Thus, the selection of materials, particularly with respect to the sealing surface is important to the application of the valve assembly 200. Also, ceramics such as alumina and nonmetallic crystalline materials, such as ruby, are much harder than metals, and the valve poppet 116 or valve seat 202 constructed of these materials is more impervious to mechanical damage by wear or particles than the softer metal. It is also noted that the valve assembly 200 may be made using elastomers as valve components if the particular application is well suited to such materials and "outgassing" is not important.

Typically, a valve assembly including a valve seat 202 and poppet 116 comprising a crystalline material, such as a metal or metallic alloy, will exhibit leaks rate of less than $4\times10^{-9}$ atmospheric cc of Helium/sec, which is required in ultra pure applications. In embodiments where both the valve seat 202 and the poppet 116 are made of a ceramic and/or ruby, the leak rates are typically significantly less than $4\times10^{-9}$ atmospheric cc of Helium/sec. Thus, in several embodiments, the valve assembly 200 is capable of use in ultra pure applications. In contrast, valve assemblies comprising elastomer materials will have a leak rate no better than $4\times10^{-9}$, which are commonly known to shut off valves.

Furthermore, since the valve assembly 200 does not contain elastomers, it is also capable of use in high temperature applications. The valve assembly of FIGS. 1 through 2B can withstand temperatures of several hundreds of degrees centigrade without leaking. In contrast, valves with elastomer valve seats 202 and poppets 116 are only able to withstand temperatures of about 70 degrees centigrade before the materials begin to degrade. This is important since in some applications the neck portion 104 may be welded or otherwise connected, e.g., via threads, to a process chamber via stainless steel tubing, that is very hot. The stainless steel tubing conducts heat easily, which will undesirably heat up the valve assembly. Semiconductor processing applications exposed to high temperatures include liquid sources that are heated, for example, liquid vaporizers and diffusion furnaces.

Furthermore, the embodiment of the valve assembly 200 employing a ceramic valve seat 202 and a ceramic poppet 116 (or a nonmetallic crystalline structure, such as ruby, for either one or both of the poppet 116 and valve seat 202) is capable of withstanding a higher temperature range than an embodiment using metallic valve components at the sealing area. For example, the ceramic material is able to be exposed to temperatures up to about 2000 degrees centigrade prior to softening, whereas metallic components are typically only able to operate up to about 500 degrees centigrade, and special metallic alloys are able to operate up to 1280 degrees centigrade for short term use, depending on the material selected before softening, and elastomer components will soften at above 100 degrees centigrade. Once the material softens, the integrity of the seal at the interface between the valve seat 202 and the poppet 116 is compromised due to deformations in the materials, resulting in an increased leak rate. Note that although the embodiment employing both a ceramic valve seat and a ceramic poppet is not entirely made of ceramic components (this would be unpractical and expensive), i.e., the valve assembly 200 employs other metallic components such that the valve assembly as a whole does not operate up to 2000 degrees centigrade. However, a valve assembly 200 using a ceramic and/or ruby valve seat/poppet will be able to operate under temperatures up to about 1000 degrees centigrade (which is limited by the other metallic components of the valve assembly 200), whereas a metallic valve seat/poppet embodiment may only operate at exposure to temperatures up to 500 degrees centigrade. Thus, typically above about 500 degrees centigrade, the metallic valve seat/poppet embodiment can not maintain a leak rate of less than $4\times10^{-9}$ atmospheric cc of Helium/sec, while the ceramic valve seat/poppet embodiment is able to maintain this desired leak rate for up to about 1000 degrees centigrade over time.

One solution is to locate a valve assembly having metallic poppets and valve seats a distance away from the heat source such that the heat conducted through the attached tubing is allowed to cool sufficiently by the time it reaches the valve assembly. Thus, the temperature that the all metallic valve assembly is exposed to is ideally under 500 degrees centigrade. In contrast, however, the ceramic valve seat/poppet embodiment does not require this extra length of tubing since it is able to withstand higher temperatures than a metallic valve seat/poppet. Such additional length of tubing may be unfeasible in some applications due to spatial constraints.

The valve assembly 200 represents a departure from the prior art in that conventional valve assemblies typically comprise either (1) a valve seat and a poppet which is actuated in and out of the valve seat by an actuator or (2) a valve seat and a metallic diaphragm that seals against or into the valve seat, common in semiconductor processing. The valve seat and poppet system is generally used in applications that are not concerned about purity of the process flow. As such, the valve seat and the poppet are generally made of elastomers or other similar inexpensive materials. In some instances, metallic materials will be used for the poppet.

The valve seat and diaphragm systems typically are concerned with purity, e.g., semiconductor processing applications. In such seat and diaphragm systems, the diaphragm is a metallic material having a desired flexibility. The diaphragm itself is moved against the valve seat to create the seal. Such an arrangement provides a low leak rate seal, but which (as described above) is typically not maintainable over about 500 degrees centigrade. The flexibility of the diaphragm allows the diaphragm to be easily deflected and forced into the valve seat.

In contrast, applicants are not aware of a high purity shut-off valve assembly having all three of a valve seat 202, a poppet 116 that self aligns into the valve seat 202 and a diaphragm (e.g., primary diaphragm 124) controlling the movement of the poppet 116 (e.g., the actuator assembly controls the deflection of the primary diaphragm 124). The addition of the diaphragm to the seat and poppet system is not necessary since the poppet already seals to the valve seat. Similarly, the addition of the poppet to a seat and diaphragm system is also an unnecessary addition since the diaphragm itself forms the seal at the seat. Additionally, a poppet of the seat and poppet system is typically inflexible, which is desired in the seat and diaphragm systems. Thus, the embodiments of FIGS. 2A and 2B provide the cleanliness of a diaphragm valve and the robustness of a poppet type valve.

Furthermore, a valve assembly 200 having a ceramic valve seat 202 and a ceramic poppet 116 is also not found in the known valves. For example, there is no reason to use such components in the traditional seat and poppet systems since there is no concern for purity and the cost would be prohibitive. The cost of a ceramic valve seat 202 and a ceramic poppet 116 is noticeably higher than similar metallic or elastomer components both in materials and manufacturing.

Furthermore, the valve assembly 200 of this and other embodiments described below is a lightweight design, typically employing metallic and ceramic components. This lightweight feature makes the valve assembly 200 suitable for aerospace applications.

Also, advantageously, the valve assembly may be made within a very small dimension, which makes the valve assembly 200 ideal in semiconductor processing applications. For example, in one embodiment, the entire valve assembly 200 is less than 13/16 inch in diameter at the body portion 106. Thus, the valve assembly 200 is suitable to be placed in-line into break points of existing semiconductor processing lines, e.g., tubing. Note also that the entire actuator assembly is contained within the exterior dimension or footprint of the valve assembly 200. In many control valves, such as mass flow controllers, the actuator assembly is typically contained outside of the footprint of the control valve.

Furthermore, the valve assembly 200 is illustrated as in the normally open configuration. This enables a valve assembly that also operates as a safety device. As such, in the event of any failure in the actuator 110, balls 222, detents 226, or the retaining ring 224, for example, the valve assembly will close due to the force of the spring 220 on the washer 218; thus preventing further process flow from traveling through the valve assembly until the failure can be repaired or replaced. This is especially useful in applications where the process flow contains harmful chemicals.

Figure 4A:
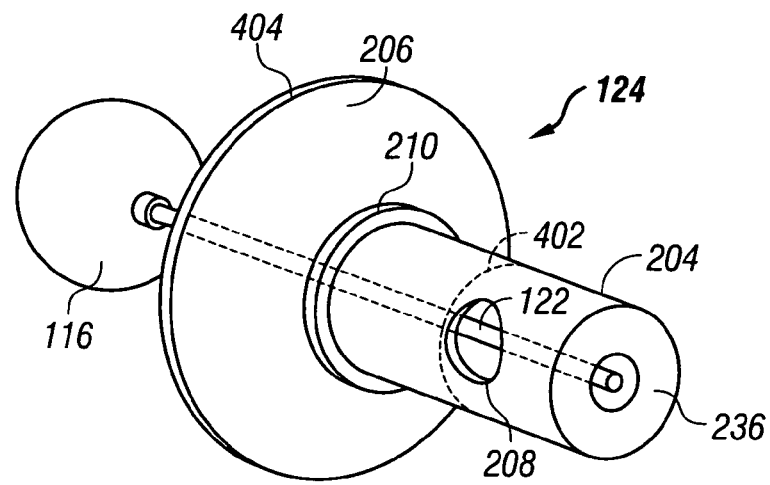
FIGS. 4A and 4B are perspective views of a primary diaphragm positioned within the valve assembly of FIGS. 2A and 2B.
Figure 4B:
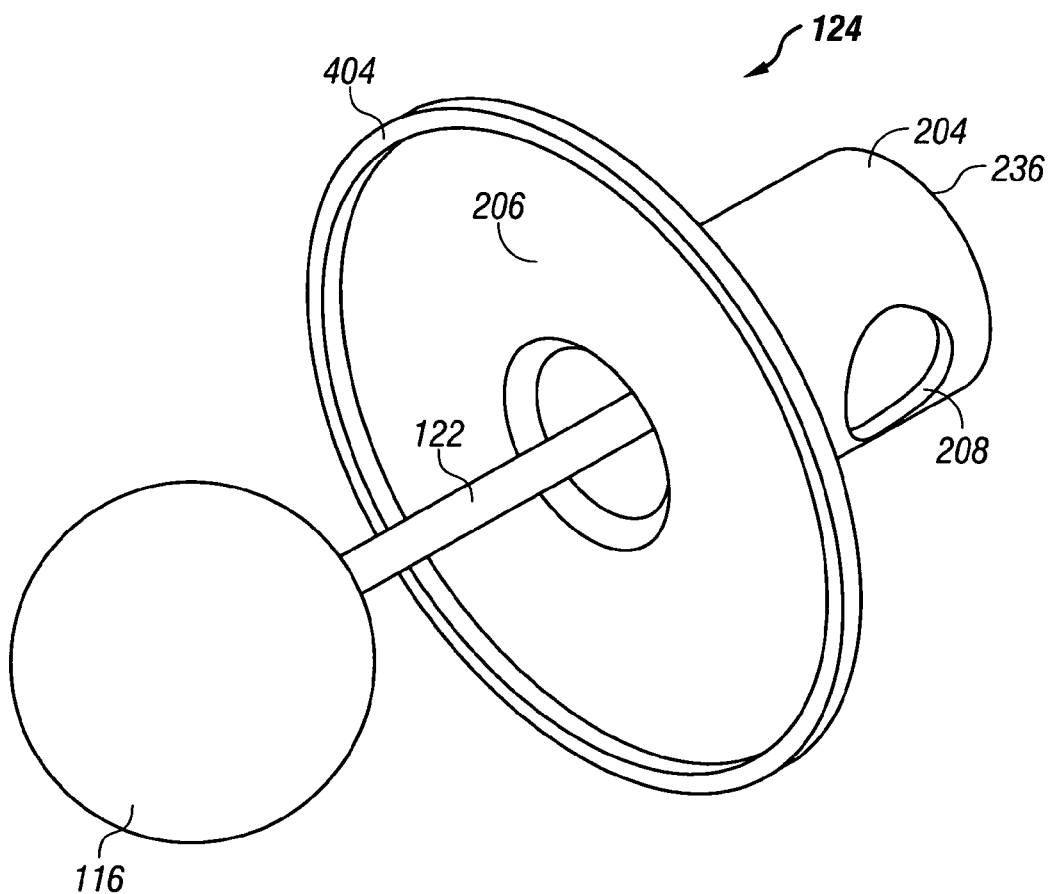

Referring next to FIGS. 4A and 4B, perspective views are shown of a primary diaphragm positioned within the valve assembly of FIGS. 2A and 2B. The primary diaphragm includes the ring portion 206 and the sleeve portion 204. The sleeve portion 204 includes flow hole 208 (preferably there are two flow holes 208) and includes edge 210 (where the washer 218 contacts the sleeve portion 204). The stem 122 is attached at the closed end 236. The inner lip 214 of the secondary diaphragm 212 is attached (e.g., welded) at dashed line 402 such that a portion of the sleeve portion 204 extends through a hole in the secondary diaphragm. The outer edge 404 of the ring portion 206 attaches, e.g., is welded or attached via crush nuts, to the interior of the body portion 106. Note that the outer edge 404 is thicker than the remainder of the ring portion 206 since the outer edge 404 is attached to the interior of the body portion.

Figure 5A:
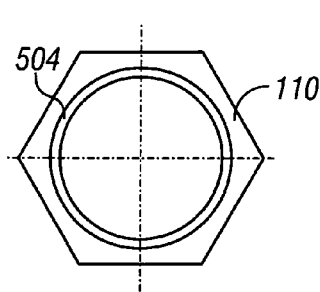
FIGS. 5A through 5C are top, side and bottom views, respectively, of an actuator used in a mechanical actuator assembly of FIGS. 1 through 2B.
Figure 5C:
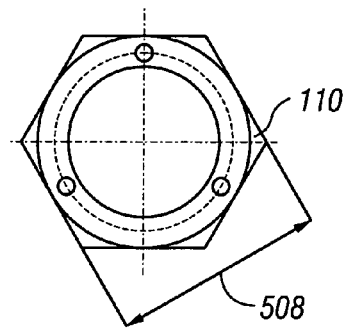
Figure 5B:
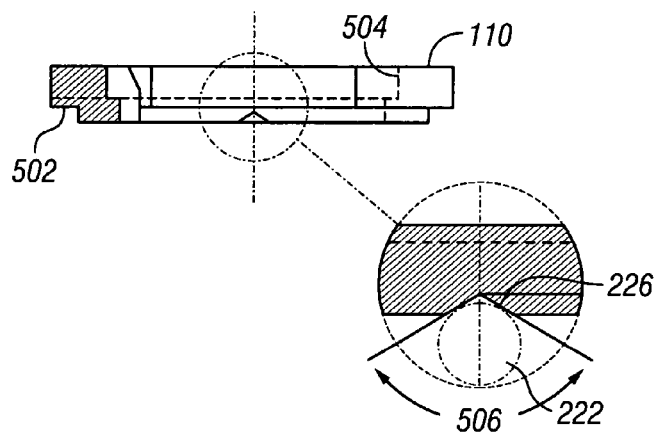

Referring next to FIGS. 5A through 5C, exemplary views are shown of the actuator used in the mechanical actuator assembly of FIGS. 1 through 2B. FIG. 5A is a top view (similar to that shown in FIG. 1), FIG. 5B is a side view, and FIG. 5C is a bottom view (i.e., a view of the actuator as facing the body portion of FIGS. 1 through 2B. The actuator 110 is a hexagonal shaped ring that has a circular bottom portion 502 and an annular groove 504 formed in the inner diameter of the actuator 110 and to fit the retaining ring 224 for holding the actuator 110 in position within the neck portion 104 of the housing. Also shown is the detent 226 that is adapted to fit the actuator balls 226. The detents are shown as triangular cut detents having an angle 506, preferably 120 degrees. Furthermore, there are preferably three detents spaced equally about the actuator 110. The actuator is designed match the dimensions of a specific application. For example, the actuator has a width 508, e.g., of 0.75 inches, which is a standard size in semiconductor processing and ultrapure applications.

Figure 6A:
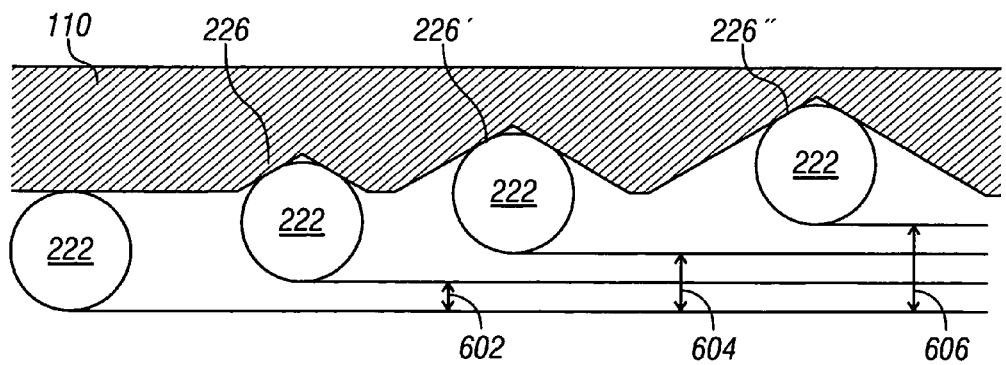
FIG. 6A is an elongated cross sectional view of a variation of the actuator ring to be used in the valve assembly of FIGS. 2A and 2B, for example, having several detents of different depths in accordance with another embodiment of the present invention.

Referring next to FIG. 6A, a cross sectional view is shown of an elongated actuator ring 110 to be used in the valve assembly of FIGS. 2A and 2B, for example, having several detents 226 of different depths in accordance with another embodiment of the present invention. The actuator ring 110 is illustrated as having several different detents 226, 226' and 226" each having different depths within the actuator ring 110. An actuator ball 222 is illustrated as sitting within each detent to illustrate the displacement distance of the ball 222 depending on which detent the ball is sitting and then forced out of by rotation of the actuator ring 110. For example, if the ball 222 is in the normally closed position in detent 2261", then the rotation of the actuator ring out of detent 226" displaces the ball 222 by displacement 606. This displacement results in the poppet being moved out of the valve seat approximately this same distance. Hence depending on the depth of the detent (e.g., 226, 226' and 226"), the poppet may have a variable travel path into and out of the valve seat, for example, between displacement 602, 604 and 606. Furthermore, all three detents may be located within the same actuator ring 110 to control exactly how far the poppet moves. Thus, in this embodiment, the valve assembly acts as both a shut off valve and a proportional valve since the poppet 116 seals against the valve seat 202 and the amount the poppet 116 lifts off of the valve seat 202 is dependent or proportional to the depth of the detents 226, 226' and 226" in the actuator 110.

Figure 6B:
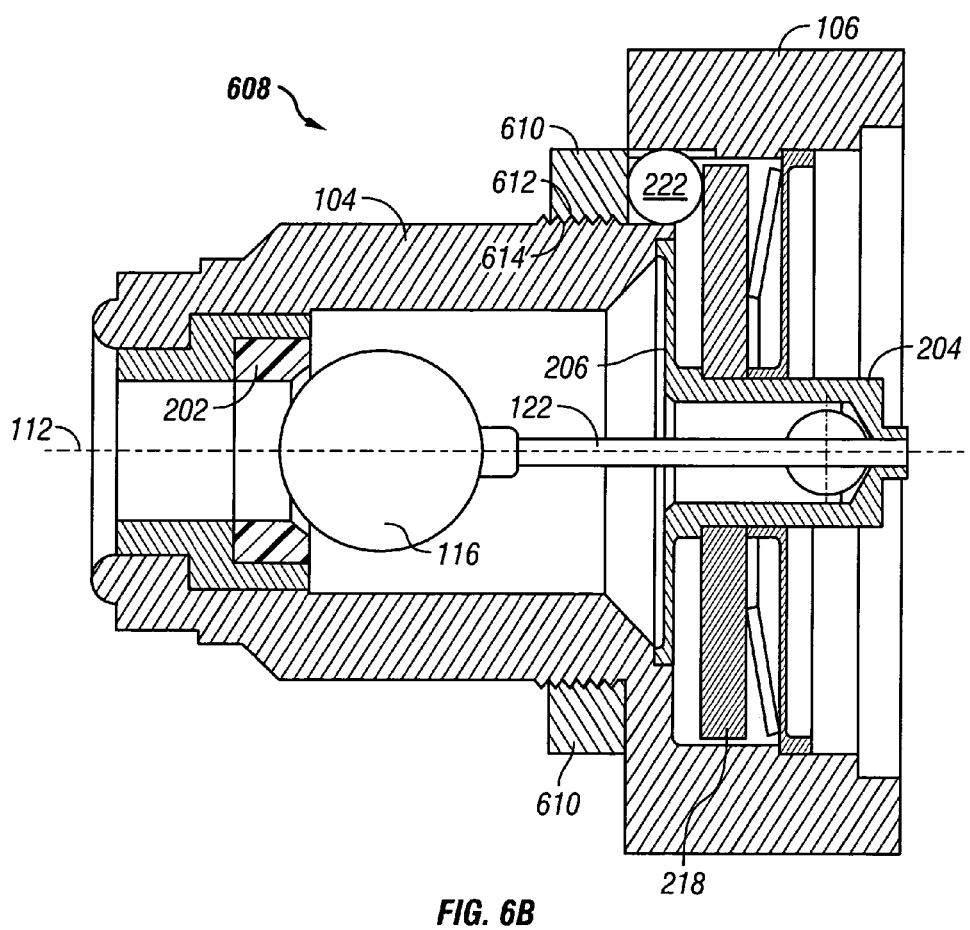
FIG. 6B is a cut away side view of a threaded actuator of an actuator assembly which is used to control the degree to which the valve assembly is opened in accordance with another embodiment of the invention.

Referring next to FIG. 6B, a cut away side view is shown of a threaded actuator of an actuator assembly which is used to control the degree to which the valve assembly is opened in accordance with another embodiment of the invention. Shown is a valve assembly 608 having the same components found in the valve assembly 200 of FIGS. 2A and 2B; however, the actuator 610 does not include detents and includes threads 612 that thread on to corresponding threads 614 on the exterior of the neck portion 104.

In operation, this embodiment provides an alternative to the actuator 110 of FIG. 6A to controlling the amount of displacement of the poppet 116 relative to the valve seat 202. In this embodiment, the actuator 610 is simply rotated about the central axis 112 which threads the actuator 610 further on to the neck portion 104 due to the threads 612 and 614 on both the actuator 610 and the neck portion 104. Thus, depending on how many turns the actuator 610 is turned, the displacement of the ball 222 is changed. Thus, the user may control the position of the poppet 116 relative to the valve seat 202 by the position of the actuator 610 on the neck portion 104. As illustrated, the actuator 610 is turned to a fully open position. This embodiment allows the valve assembly to act as both a shut off valve and a valve in which the rate of the process flow is controlled due to the degree to which the poppet 116 is unsealed (displaced) relative to the seat assembly by the position of the actuator 610 about the neck portion 104.

Thus, the embodiments as shown in FIGS. 5A–6B illustrate an actuator assembly that causes variably deflections of the ring portion of the first diaphragm assembly and the second diaphragm. These variable deflections moves the sleeve portion a variable distance, and thus, the position of the valve head relative to the valve seat is variably selectable. Thus, the valve assembly becomes a proportional valve assembly. It is also noted that other actuating mechanisms may also create variable movement of the poppet, such as the embodiments of FIGS. 9–10 and 14–15.

Figure 7:
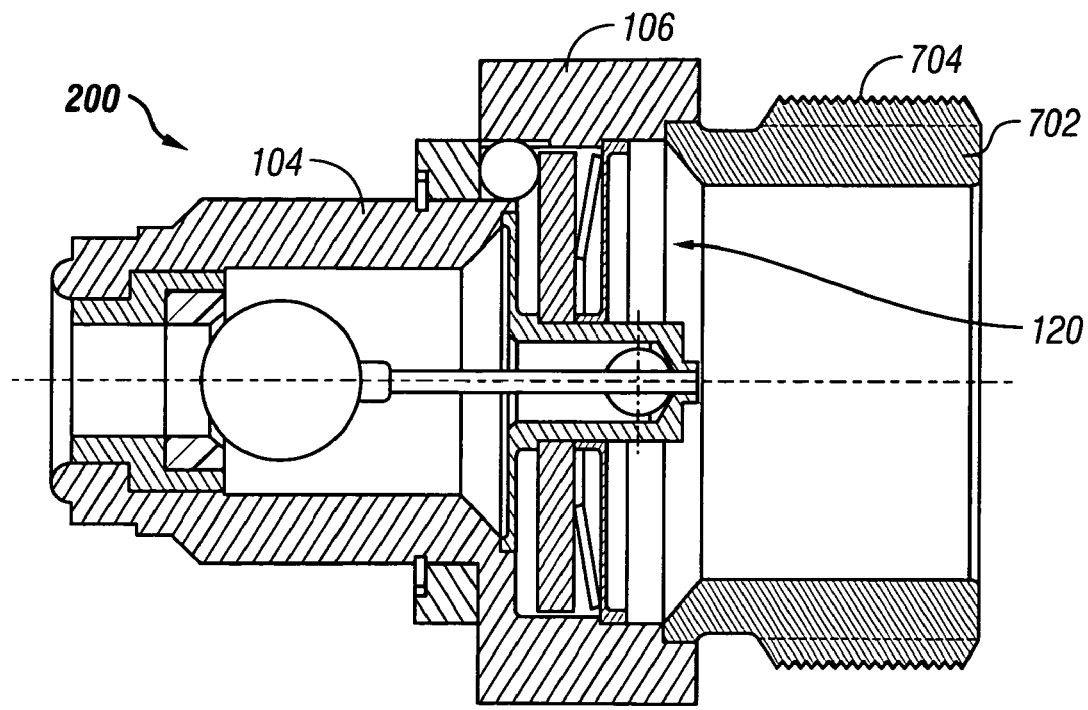
FIG. 7 is a cut-away side view of the valve assembly of FIGS. 2A and 2B including a threaded extension in accordance with another embodiment of the invention.

Referring next to FIG. 7, a cut-away side view is shown of the valve assembly of FIGS. 2A and 2B including a threaded extension in accordance with another embodiment of the invention. The valve assembly 200 includes a threaded extension 702 which is typically welded into the interior of the body portion 106 of the housing 102 near the second opening 120. The threaded extension 702 includes threads 704 that are used to threadably attached a variety of devices. For example, devices such as manifolds, tanks, purifiers, mass flow controllers and valve bodies may be attached to the threaded extension 702.

Figure 8:
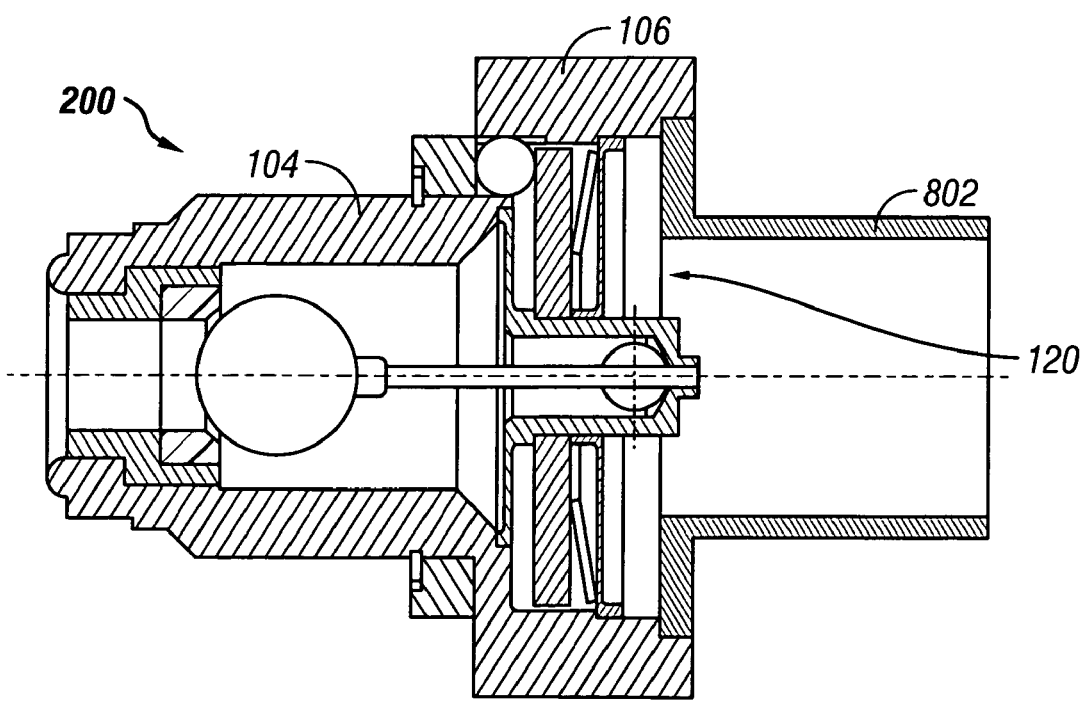
FIG. 8 is a cut-away side view of the valve assembly of FIGS. 2A and 2B including a tube valve extension in accordance with a further embodiment of the invention.

Referring next to FIG. 8, a cut-away side view of the valve assembly of FIGS. 2A and 2B including a tube valve extension in accordance with a further embodiment of the invention. In this embodiment, a tube valve extension 802 is welded to the interior of the body portion 106 of the housing 102 near the second opening 120. Thus, practically any device employing a weld joint, compression fitting, threaded interface or a metal face seal, may be attached to the tube extension 802.

Figure 9:
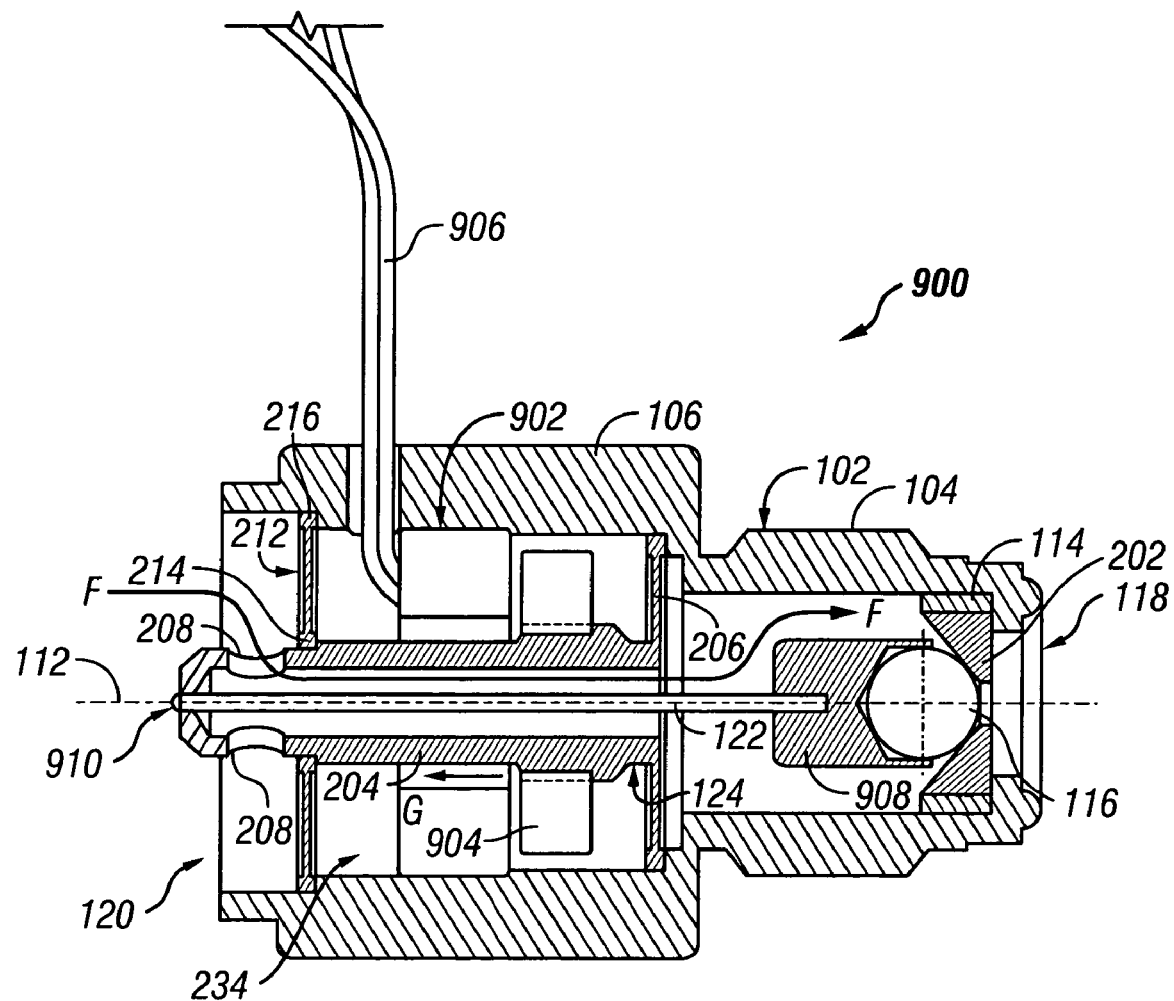
FIG. 9 is a cut-away side view of a variation of the valve assembly of FIGS. 1 through 2B including an electromagnetic or piezoelectric actuator in a "normally closed" position in accordance with yet another embodiment of the invention.

Referring next to FIG. 9, a cut-away side view is shown of a variation of the valve assembly of FIGS. 1 through 2B including an electromagnetic or piezoelectric actuator in accordance with yet another embodiment of the invention. Shown is a valve assembly 900 including a housing 102 having a neck portion 104 and body portion 106, a first opening 118 and a second opening 120. Also shown are a seat assembly 114 including a valve seat 202, a stem 122, and a poppet assembly 908 including the poppet 116. Note that in this embodiment, the stem 122 and the poppet assembly 908 together comprise a "self-aligning head assembly". Also shown is a diaphragm assembly including a primary diaphragm 124 and a secondary diaphragm 212. The primary diaphragm 124 includes a sleeve portion 204, a ring portion 206, stem weld 910 and at least one flow hole 208. The secondary diaphragm 212 includes an inner lip 214 and an outer lip 216. Also included is an actuator assembly including a solenoid 902, washer 904 and electrical leads 906. Also shown is a central axis 112 and non-gas wetted volume 234. The process flow is in the direction indicated by Arrows F.

This embodiment is similar to the embodiments of FIGS. 1 through 2B, although does not use a mechanical actuation assembly. This embodiment employs either an electromagnetic actuator assembly or a piezoelectric actuator assembly. Furthermore, the valve assembly 900 of this embodiment illustrates a process flow in the opposite direction through the valve assembly as illustrated in FIGS. 2A and 2B.

The valve assembly 900 is shown in a "normally closed" position, such that the poppet 116 is sealed into the valve seat 202. Note that in this embodiment, the poppet 116 is part of the poppet assembly 908; however, the poppet 116 may simply be attached directly to the stem 122. Again, the stem 122 is attached to the sleeve portion 204 at stem weld 910 and does not contact the sleeve portion 204 at any other point. Furthermore, as shown in the embodiments of FIGS. 2A and 2B, the ring portion 206 of the primary diaphragm 124 is sealed to the body portion 106 and the secondary diaphragm 212 is sealed to the body portion 106 at the outer lip 216 and to the sleeve portion 204 at the inner lip 214; thus, forming the non-gas wetted volume 234. Although the diaphragm assembly is shown as having two components welded together, i.e., the primary diaphragm 124 and the secondary diaphragm 212, the diaphragm assembly may comprise a single diaphragm similar to the unitary combination of the primary diaphragm 124 and the secondary diaphragm 212.

The actuator assembly is contained within the non-gas wetted volume 234. In the electromagnetic actuator assembly embodiment, the electro-magnetic assembly includes the solenoid 902 which is a coil formed around the sleeve portion 204 of the primary diaphragm 124. Electrical leads 906 are coupled to the solenoid 902 via holes in the body portion 106, and washer 904 is positioned within the non-gas wetted volume 234 between the solenoid 902 and the ring portion 206. The washer 904 is attached, e.g., welded, to an exterior surface of the sleeve portion 204.

In operation, in the "normally closed" position, the solenoid 902 is not energized. The ring portion 206 and the secondary diaphragm 212 are preferably metallic sheets having an elastic quality such that they may be deflected and then return to a normal position. As shown, in FIG. 9, the normal position is such that the poppet 116 is sealed into the valve seat 202. Upon activation, the solenoid 902, which is an electromagnet, is energized by current applied through the electrical leads 906, which causes the sleeve portion 204 to move in the direction of Arrow G. This movement is allowed due to the ability of the ring portion 206 and the secondary diaphragm 212 to deflect. This movement causes the stem 122 and the poppet 116 to move in the direction of Arrow G; thus, unsealing or opening the valve for the process flow to pass therethrough.

The movement of the poppet is limited by the washer 904. The washer 904 is attached at a distance from the solenoid 902 when the solenoid 902 is not energized, such that when the sleeve portion 204 moves, it can only move that distance before the washer 904 contacts the side of the solenoid 902. This effectively prevents the poppet 116 from being opened too far. The washer 904 further prevents the ring portion 206 and the secondary diaphragm 212 from being deflected too far, such that the ring portion 206 and the secondary diaphragm 212 may not return to the original position when the current is not supplied to the solenoid 902. Thus, in contrast to the embodiments of FIGS. 2A and 2B, washer 904 of FIG. 9 is attached to the sleeve portion 204, wherein washer 218 of FIGS. 2A and 2B is not.

In order to keep the valve open, current must be applied to the solenoid 902, otherwise, the valve will close, i.e., the poppet 116 will move back into the valve seat 202. This advantageously turns the valve assembly 900 into a safety valve such that if there is failure of the electromagnetic actuator assembly, e.g., a failure in the power supply, the valve will automatically close.

In the piezoelectric actuator assembly embodiment, a solenoid 902 is not used, but is replaced by a piezoelectric material (not shown), as known in the art and positioned within the non-gas wetted volume 234. As an electric field, i.e., voltage, is applied via the electrical leads 906 to the piezoelectric material, a stress is induced in the piezoelectric material causing it to expand. Since, in one embodiment, the piezoelectric material is attached to the sleeve portion 204, the sleeve portion 204 moves as the piezoelectric material expands, which thus alters the position of the poppet 116 relative to the valve seat 202. Again, in order to keep the valve "open", the electric field must be applied to the piezoelectric material. Generally, the structure and functionality of both electromagnetic and piezoelectric actuating devices, as conventionally applied, are known in the art.

It is noted that the process flow, e.g., gas, liquid, or slurry, in the direction of Arrow F is helpful in this embodiment to assist in maintaining the poppet 116 in a sealed position while the actuator assembly is not energized. This is due to the fact the process flow will exert pressure behind the poppet assembly 908, as opposed to against the poppet 116 if the process flow were reversed. Thus, employing a poppet assembly 908 shaped as a block (in the back) assists in maintaining the poppet 116 in the closed position, since the poppet assembly 908 gives the process flow a surface to push against.

This embodiment is also consistent with the embodiments described above in that the valve assembly may act as both a shut-off valve and a proportional valve in which the rate of the process flow is controllable since the various parameters of the size of the poppet 116, valve seat 202, travel distance of the poppet 116, and flow holes 212, for example, may be varied to alter the rate at which the process flow passes through the valve assembly 900. Additionally, as described above, the valve seat 202 and poppet 116 may be made out of any the earlier described materials.

Furthermore, the flexible stem 122 and the poppet 116, preferably a spherical poppet, provide a very tight self-aligning head assembly that accurately seals to the valve seat 202 even if the alignment of the stem 122 in not perfect with respect to the valve seat 202. This self-alignment reduces inboard leaks. It is noted that the "self-aligning head assembly" is coupled to the primary diaphragm 124. The non-gas wetted volume 234 is sealed from the remainder of the interior volume of the valve assembly 900 preventing outboard leaks through the electrical leads 906. And the selection of the materials, particularly with the poppet 116 and the valve seat 202 may be optimized for differing applications so that contamination due to degradation and corrosion is minimized.

Furthermore, the neck portion 104 may be smooth or threaded for connection to other devices known in the art. Threaded extensions 702 and tube adapters 802, such as shown in FIGS. 7 and 8 may also be attached to the valve assembly 900 at the second opening 120.

Figure 11:
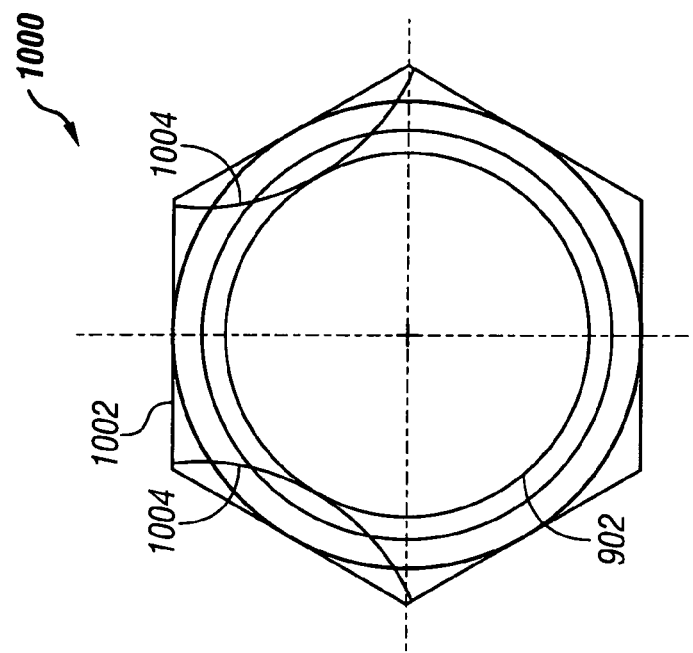
FIG. 11 is an end view of the valve assembly of FIG. 10 illustrating the hexagonal shape of the housing and the placement of cooling vents on the housing.
Figure 10:
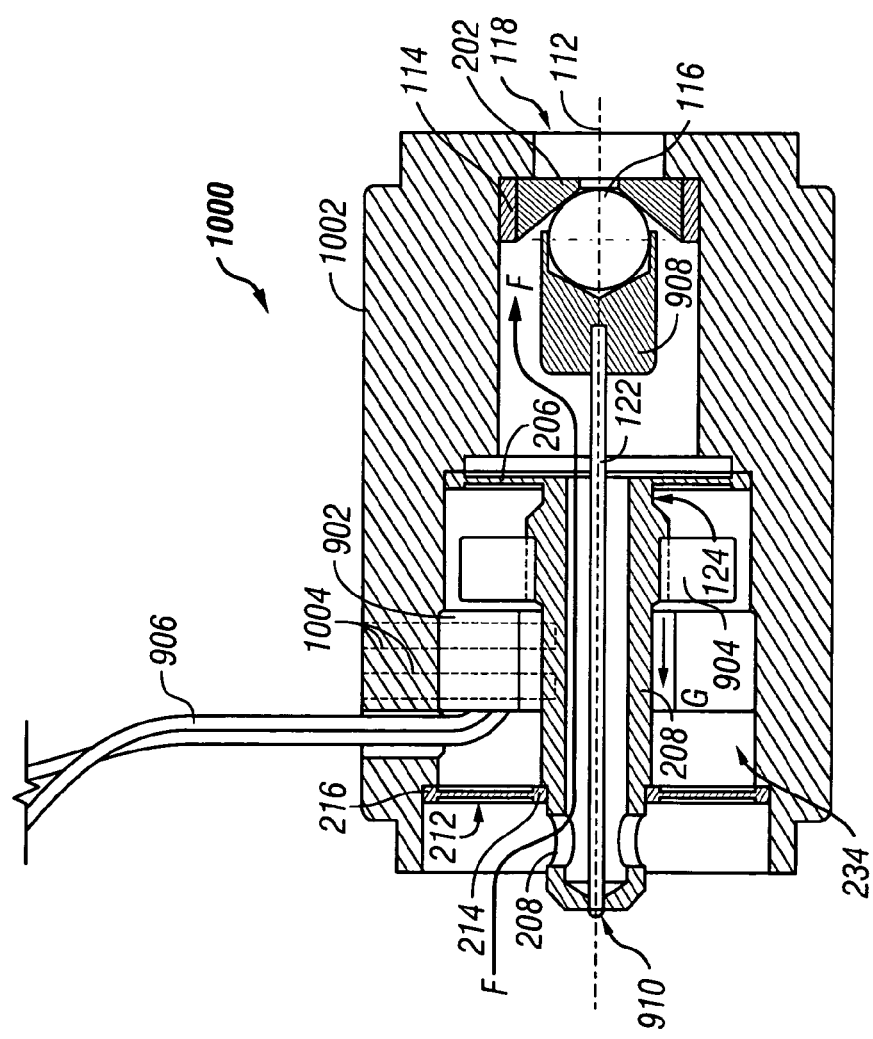
FIG. 10 is a cut-away side view of a variation of the valve assembly of FIG. 9 illustrating an alternative housing design.

Referring next to FIG. 10, a cut-away side view is shown of a variation of the valve assembly of FIG. 9 illustrating an alternative housing design. The valve assembly 1000 is identical to the valve assembly of FIG. 9, except for an alternative housing. The housing 1002 is a straight hexagonal length section. Furthermore, vents 1004 are illustrated which are used to cool the solenoid 902 during operation, in particular, in the electromagnetic actuator embodiments. The vents 1004 are typically cut into the side of the housing 1002 exposing the non-gas wetted volume 234 to the outside environment, allowing a path for the heat generated during use to escape. An end view is shown in FIG. 11 of the valve assembly 1000 illustrating the hexagonal shape of the housing 1002 and the placement of the vents 1004 in relation to the solenoid 902, which is either an electromagnet or a piezoelectric material.

Figure 12:
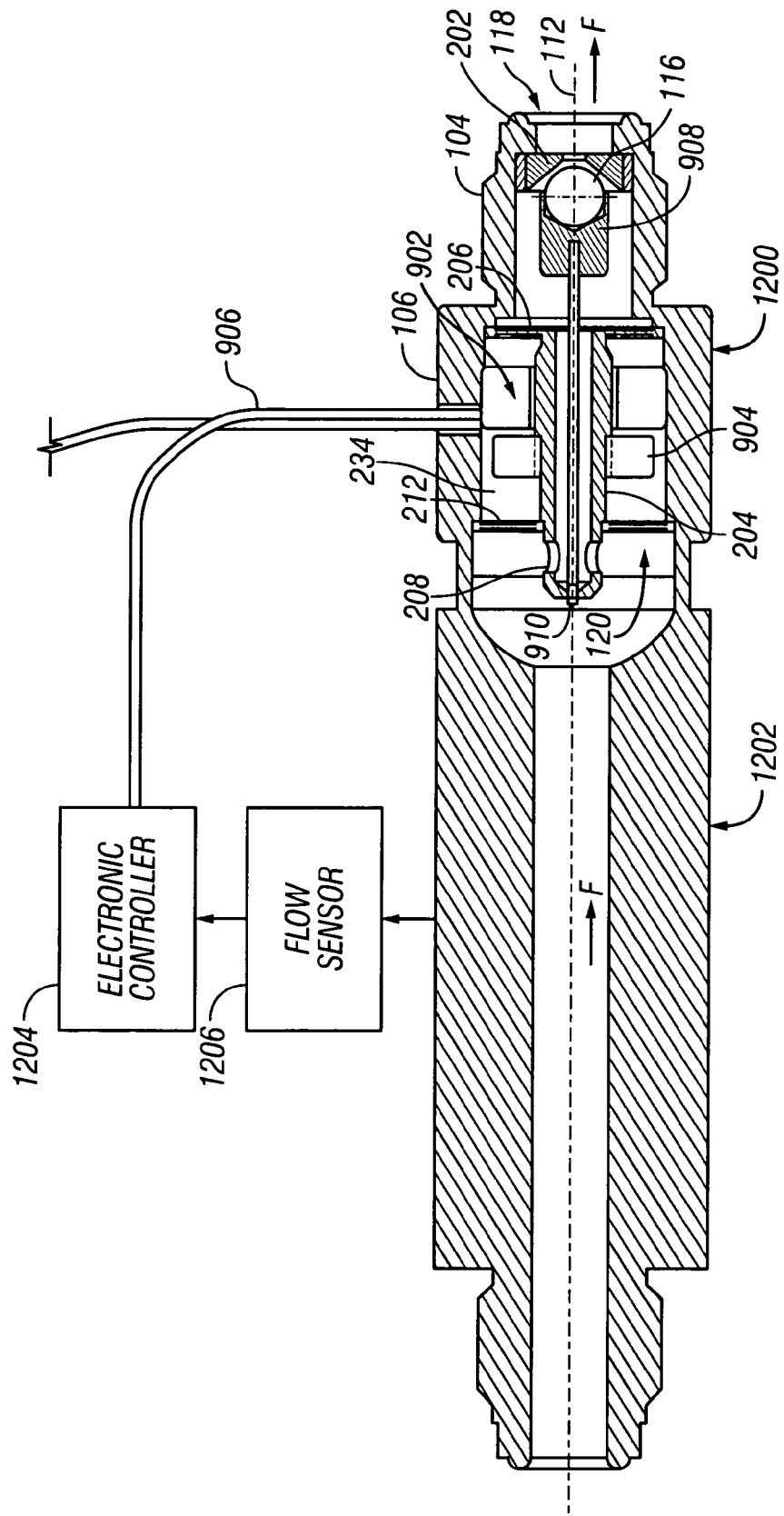
FIG. 12 is a cut-away side view of a variation the valve assembly of FIG. 9 in a "normally open" position including a meter section in accordance with yet another further embodiment of the invention.

Referring next to FIG. 12, a cut-away side view is shown of a variation the valve assembly of FIG. 9 in a "normally open" position including a meter section in accordance with yet another further embodiment of the invention. Shown is the valve assembly 1200, which includes the same components as the valve assembly 900 of FIG. 9, which the addition of the meter section 1202 which is attached, e.g., welded, pressed, or threaded, into the second opening 120 of the valve assembly 1200. Furthermore, a flow sensor 1206 is coupled to the meter section 1202, an electronic controller 1204 is coupled to the flow sensor 1206 and is also coupled to the solenoid 902 via an electrical lead 906.

One application of the valve assembly 1200 of various embodiments, is to connect the valve assembly 1200 to a standard meter section 1202, flow sensor 1206 and electronic controller 1204; thus, creating a mass flow controller. As known in the art, the meter section 1202 is a component that passes a process flow therethrough. The meter section 1202 is a flow restrictor and includes a flow sensor 1206 to sense the rate of flow through the meter section 1202. The flow sensor 1206 communicates the flow rate to the electronic controller 1204, which is also a standard component to mass flow controllers, which determines whether or not to open or close the valve assembly 1200, or to what degree the valve assembly 1200 should be opened to effect a desired flow rate. Thus, the electronic controller 1204 controls the valve assembly 1200 and can cause a variable electrical signal to the solenoid 902 of the valve assembly 1200. As is known in the art, the flow sensor 1206 may sense the flow rate based upon pressure, thermals, acoustic or corriolis, for example. This system advantageously represents a compact, in line mass flow controller, as opposed to conventional mass flow controllers using complicated out-of-line valve assemblies and actuating devices. The components and functionality of the meter section 1202 and the electronic controller 1204 are known in the art.

A further feature illustrated in FIG. 12 is that the embodiment of FIG. 12 is configured to be a "normally open" valve assembly 1200, such that the poppet 116 is normally unsealed from the valve seat 202. The internal arrangement of the washer 904 (also referred to as ring 904) and the solenoid 902 are reversed in this embodiment, such that when the solenoid 902 is not energized, the secondary diaphragm 212 and the ring portion 206 of the primary diaphragm 124 are not deflected and the poppet 116 rests unsealed from the valve seat 202.

Once current is supplied to the solenoid 902, the sleeve portion 204 is pulled in the direction of the Arrow F, deflecting the secondary diaphragm 212 and the ring portion 206 until the washer contacts the side of the solenoid 902. Thus, advantageously, the poppet 116 is moved into the valve seat 202 in a self-aligning manner as described above. The sleeve portion 204 is prevented from moving too far by the washer 904. If the sleeve portion 204 were allowed to move unrestrained, the secondary diaphragm and/or the ring portion may be deflected such a distance that they are damaged and not able to return to their original position once the current is removed.

It is noted that any of the embodiments of the valve assembly may be configured to be either "normally open" or "normally closed", and the flow direction of the process flow may be in either direction as well, depending on the specific embodiment.

Figure 13A:
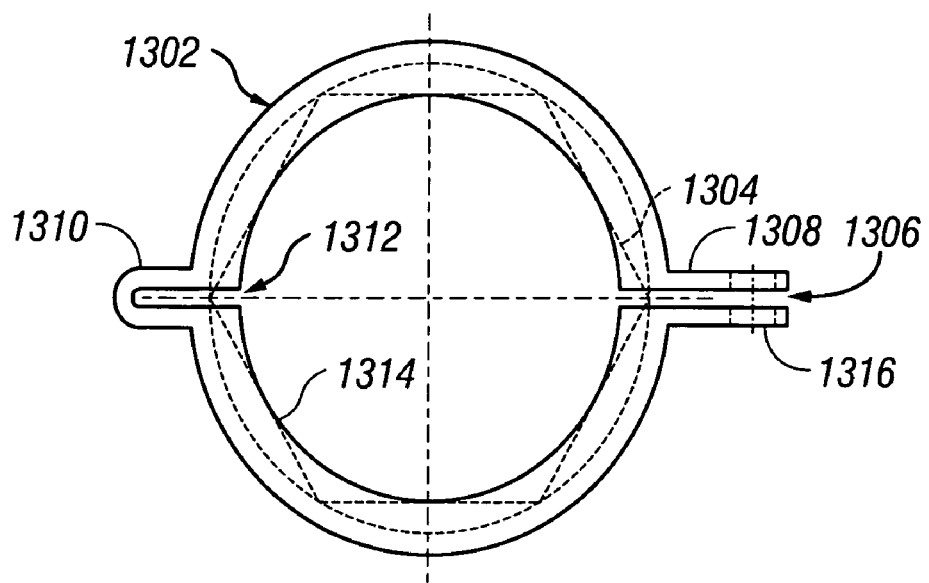
FIGS. 13A and 13B are an end view and a top down view, respectively, of an actuator cover to be positioned over the actuator ring of the mechanical actuator of the valve assembly of FIGS. 1 through 2B and 5A through 5C for compliance with "lock out, tag out" regulations.
Figure 13B:
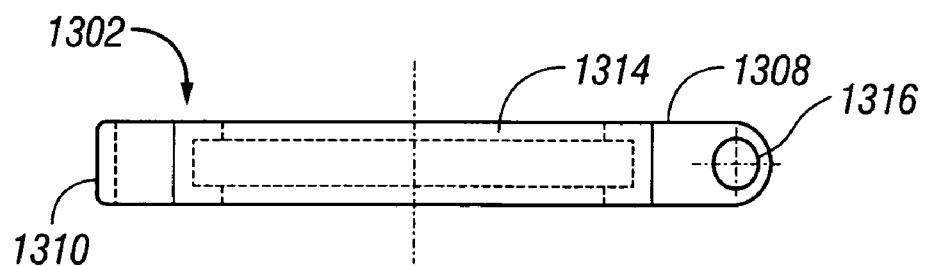

Referring next to FIGS. 13A and 13B, an end view and a top down view, respectively, are shown of an actuator cover to be positioned over the actuator ring of the mechanical actuator of the valve assembly of FIGS. 1 through 2B and 5A through 5C for compliance with "lock out, tag out" regulations. Shown is the actuator cover 1302 to be placed over the actuator ring 110 of the valve assembly of FIG. 1, for example. Dashed line 1304 represents the actuator 110 as if fit within the actuator cover 1302. The actuator cover 1302 is circular with a split 1306 and having tabs 1308 that extend from the actuator cover 1302 at the split 1306. At an opposite end of the actuator cover 1302, a hinge section 1310 is formed with at another split 1312 in the actuator cover (this split 1312 does not separate the actuator cover 1302). The actuator cover 1302 also includes side walls 1314 that cover the edges of the actuator ring 1304. Additionally, a hole 1316 is formed in each tab 1308.

In operation, the actuator cover 1302 is pulled apart at the tabs 1308, opening the actuator cover 1302 about the hinge section 1310. The actuator cover 1302 is then placed over the actuator ring 1304 so that the actuator cover 1302 loosely fits over the actuator ring 1304. This enables the valve assembly to comply with "lock out, tag out" (LOTO) regulations. These regulations require that a lethal source of power or material can be locked in the off position, and that a tag be placed on it letting operators know that it is disabled for service and is not to be powered on. This is often seen on circuit breaker boxes, where the handle to close and power on the box has a loop in which a technician can place a padlock. Thus, nobody can turn the power on while the technician is working on the electrical line. This is also true for gas or fluid lines carrying toxic materials via a valve assembly. These toxic materials may injure a technician exposed to such toxic materials during service.

Thus, advantageously, the actuator cover 1302 slips over the actuator ring 1304. The technician servicing the devices attached to the valve assembly then places a "tag" attached to a small pin through the holes 1316 of the tabs 1308. This tag, in addition to the presence of the actuator cover 1302 itself, alerts others that the line is being serviced so that the toxic chemical flow is not accidentally turned back on, e.g., by rotating the actuator ring 1304. The actuator cover 1302 would simply rotate over the top of the actuator ring 1304 without the actuator ring 1304 itself rotating.

Figure 14:
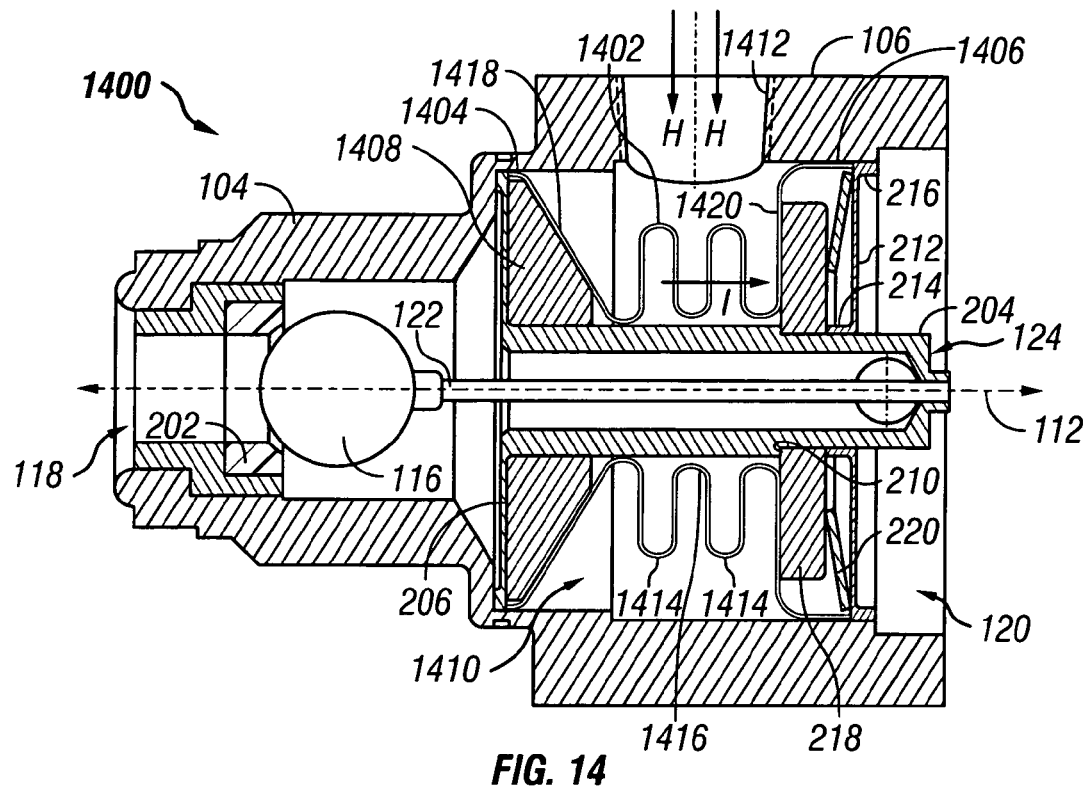
FIG. 14 is a cut-away side view of a variation of the valve assembly of FIGS. 1 through 2B including a pneumatic or hydraulic actuator assembly in an open position in accordance with yet another embodiment of the invention.

Referring next to FIG. 14, a cut-away side view is shown of a variation of the valve assembly of FIGS. 1 through 2B including a pneumatic or hydraulic actuator assembly in an "open" position in accordance with yet another embodiment of the invention. The valve assembly 1400 is very similar to and contains many of the same components as the valve assembly 200 of FIGS. 2A and 2B; however, the actuator assembly is different. In this embodiment, the actuator assembly comprises either a pneumatic actuator assembly or a hydraulic actuator assembly. The actuator assembly includes the washer 218, the spring 220, a baffle 1402 having a first end 1404 and a second end 1406, a limiter 1408, and a pressure inlet 1412. The non-gas wetted volume of this embodiment is a sealed pressure chamber 1410.

The pneumatic or hydraulic actuator assembly embodiment of the valve assembly 1400 operates by forcing gas or fluid into the sealed pressure chamber 1410, which applies a force to open the valve assembly, i.e., unseal the poppet 116 from the valve seat 202. The configuration of the valve assembly aside from the actuator assembly is essentially the same as described above, while the actuator assembly is different than described above.

The non-gas wetted volume of the previous embodiments becomes the sealed pressure chamber 1410 which contains a gas or fluid maintained under a variable amount of pressure. Within the sealed pressure chamber 1410, the spring 220 is positioned between the washer 218 and the secondary diaphragm 212. The spring 220 contacts the secondary diaphragm 212 at the outer lip 216 and the washer 218. The washer 218 rests against the edge 210 of the primary diaphragm 124. The sleeve portion 204 of the primary diaphragm 124 is slightly longer than in the previous embodiments to create a larger sealed pressure volume 1410. As such, the edge 210 is located farther away from the ring portion 206 than the edge 210 in FIGS. 2A and 2B, for example.

Positioned in between the ring portion 206 and the washer 218 is the baffle 1402, which is preferably a metallic sheet-like expanding device. The baffle 1402 is attached, e.g., welded, at its first end 1404 to the same location of the interior of the body portion 106 as the ring portion is attached. The second end 1406 is attached, e.g., welded, at the same location of the interior of the body portion 106 as the outer lip 216 of the secondary diaphragm 212. The baffle 1402 extends in a serpentine manner in between its first and second ends 1404 and 1406, forming humps 1414 and troughs 1416. Preferably, the baffle 1402 is a thin sheet of metallic material, e.g., a stainless steel or Hastelloy. A first length 1418 of the baffle 1402 near the first end 1404 contacts (but is not attached to) a limiter 1408 and a second length 1420 of the baffle 1402 near the second end 1406 contacts (but is not attached to) the washer 218. The limiter 1408 is a wedge-shaped structure that is "slip-fit" in between the ring portion 206 of the primary diaphragm and the first length 1418.

In operation, a gas or fluid is forced into the sealed pressure volume 1410 by, for example, a solenoid valve or pilot valve (not shown) that is coupled to the sealed pressure volume 1410 via the pressure inlet 1412. As is known in the art, a pilot valve actuates another valve, but never actually contacts the process flow. Typically, a solenoid valve is used as a gas or fluid pump to maintain the gas or fluid under the desired pressure. An example of a suitable device is Solenoid Valve Part No. VQ100, commercially available from SMC Pneumatics, Inc. of Indianapolis, Ind., or Mimimatic solenoid valves commercially available from Clippard Instrument Laboratories, Inc. of Cincinnati, Ohio. Such solenoid valves, as known in the art, typically supply a gas (e.g., air or nitrogen) or fluid (e.g., water) at about 80 psi, for example.

When the gas or fluid is forced into the sealed pressure chamber 1410 via the pressure inlet 1412, indicated by Arrows H, the sealed pressure volume 1410 fills with the gas or liquid. Once the pressure builds within the sealed pressure chamber 1410, pressure is exerted on the baffle, such that the baffle is caused to expand in the direction of Arrow I. As such, the second length 1420 of the baffle 1402 pushes against the washer 218 which causes the washer 218 to move in the direction of arrow I, compressing the spring 220. When the force exerted by the spring 220 on the washer 218 is overcome, the sleeve portion 204 is caused to move slightly in the direction of Arrow I, unsealing the poppet 116 from the valve seat 202.

The baffle 1402 is able to apply pressure to the washer 218 since the first length 1418 of the baffle 1402 is prevented from moving in a direction opposite to Arrow I by the limiter 1408. The limiter 1408 is not attached to the ring portion 206 or the sleeve portion 204, but it is positioned such that the first length 1418 of the baffle 1402 is held tightly against the limiter 1408 when under pressure. Thus, all pressure exerted by the gas or fluid into the sealed pressure chamber 1410 concentrates to press the baffle 1402 such that it expands in the direction of Arrow I. For example, the humps 1414 are shortened and the troughs 1416 are widened. This translates into an axial force exerted by the second length 1420 of the baffle 1402 against the washer 218.

Note that this embodiment of the valve assembly 1400 may be comprised of similar materials as any of the previous embodiments. For example, the poppet 116 and valve seat 202 may be comprised of metals, ceramics, elastomers, etc. depending on the application. Furthermore, the direction of the process flow may be from the first opening 118 (i.e., a valve inlet) to the second opening 120 (i.e., a valve outlet) or from the second opening 120 (i.e., a valve inlet, in this case) to the first opening 118 (i.e., a valve outlet, in this case) depending on the application.

Figure 15:
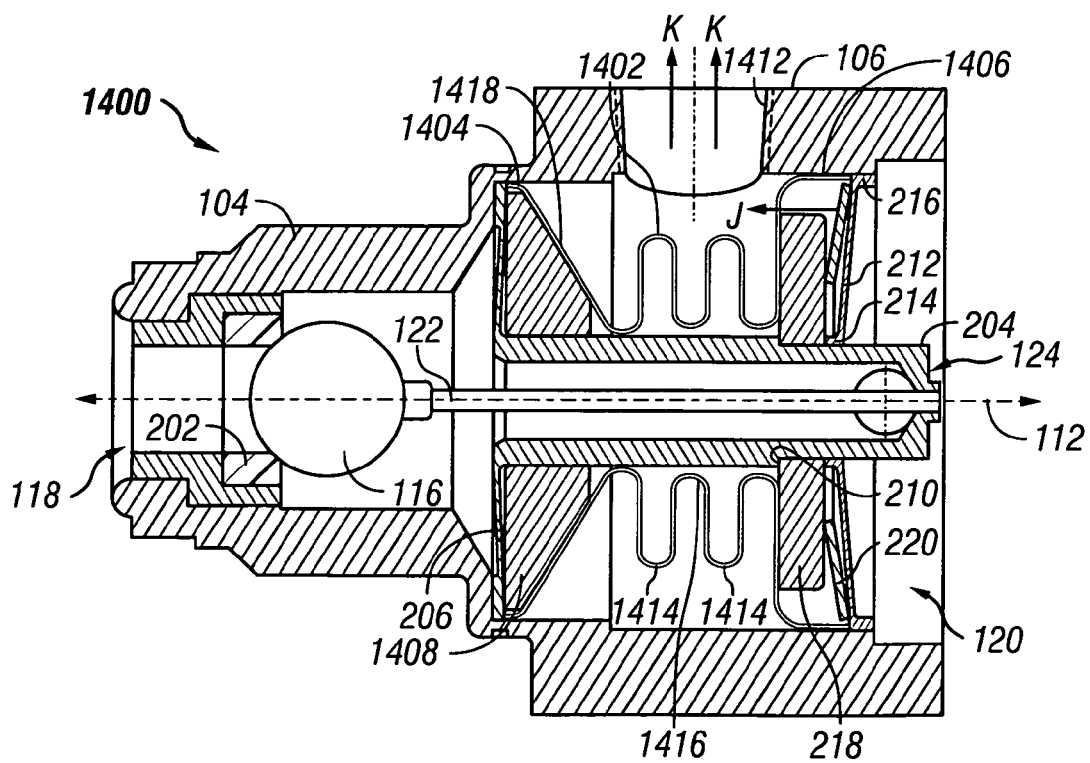
FIG. 15 is a cut away side view of the valve assembly of FIG. 14 in a closed position.

Referring next to FIG. 15, a cut away side view is shown of the valve assembly of FIG. 14 in a "closed" position. The valve assembly 1400 of FIG. 15 has the same components as shown in FIG. 14; however, illustrates the closed position of the valve assembly 1400.

In order to close the valve assembly 1400, the gas or fluid being held within the sealed pressure volume 1410 is evacuated via the pressure inlet 1412 in the direction of Arrows K. As the pressure within the sealed pressure volume 1410 decreases, the pressure exerted upon the washer 218 by the second length 1420 of the baffle 1402 in the direction of the Arrow I decreases until the pressure applied by the spring 220 in the direction of Arrow J overcomes the pressure in the direction of Arrow I. As such, the spring 220 forces the washer 218 in the direction of Arrow J, which contacts the edge 210 of the sleeve portion 204 and forces the sleeve portion 204 in the direction of Arrow J. The sleeve portion 204 is able to move because of the deflectable ring portion 206, which is illustrated as slightly deflected toward to the poppet 116. The baffle 1402 compresses back to an original or slightly compressed state, i.e., the humps 1414 are taller and the troughs 1416 are thinner. Thus, the poppet 116 is also moved in the direction of Arrow J into the valve seat 202. The sleeve portion 204 moves within the limiter 1408 such that the limiter 1408 does not prevent the sleeve portion 204 and thus, the poppet 116, from moving. However, the limiter 1408 does help to limit the amount of pressure that sleeve portion 204 can exert on the stem 122 and poppet 116.

Furthermore, the limiter 1404 gives the first length 1418 of the baffle 1402 a surface to brace against which would tend to exert a force back against the washer 218 at the second length 1420 in the event the spring 220 applied too much force on the washer 218. Thus, the further the spring 220 causes the washer 218 (and the sleeve portion 204), the more resistance to that movement is generated in the baffle 1402. Thus, the ring portion 206, which is ultimately deflected as a result of the force of the spring 220, is not allowed to "over-deflect", which could damage the ring portion 206.

The embodiments utilizing the pneumatic or hydraulic actuator assemblies have an advantage since they can be entirely automated, as opposed to the mechanical actuator assemblies (see, for example, FIGS. 1–2B), which an operator is needed to open and close the valve assembly. Additionally, known solenoid valves are capable of controlling many separate valve assemblies.

Furthermore, pneumatic or hydraulic actuator assemblies are advantageous in some applications over electrical actuator devices, such as the electromagnetic and piezoelectric actuator assemblies (see, for example, FIGS. 9–10), since no electronics as employed at the valve assembly 1400. These electronics can lead to exposure of voltages and electric fields to flammable or volatile gases or fluids. Furthermore, pneumatics and hydraulics are typically capable of generating a higher actuating force and also of operating at higher temperatures than an electromagnetic or piezoelectric actuator assembly.

Figure 16:
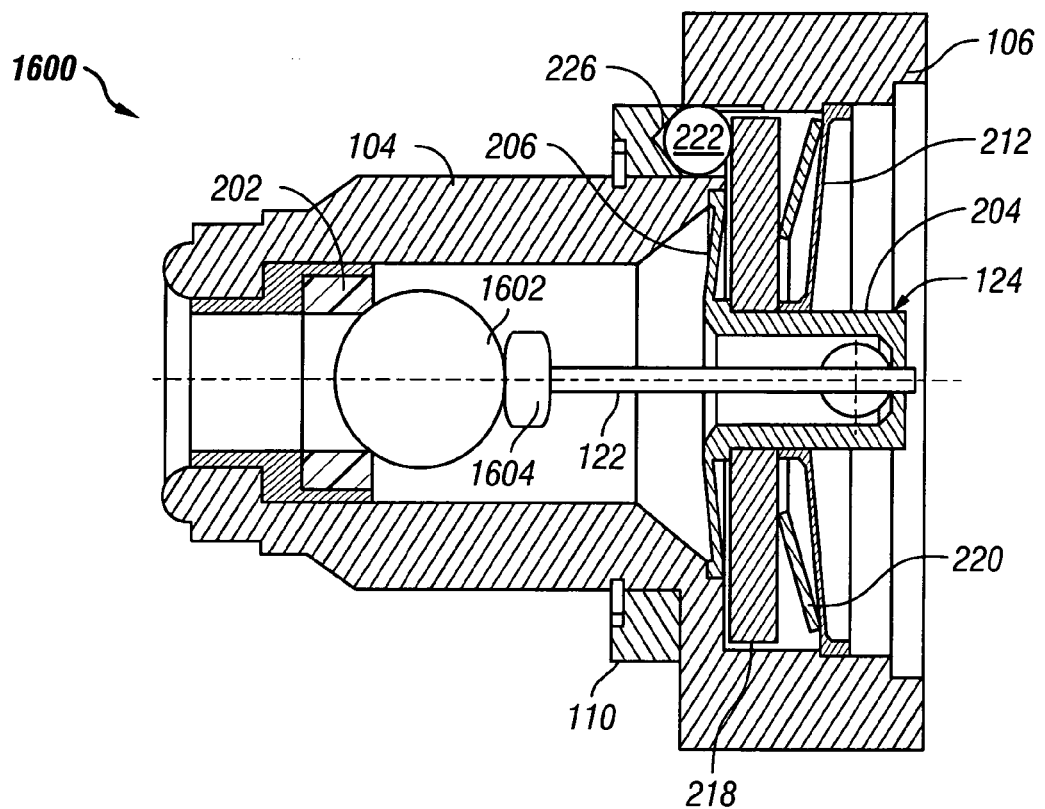
FIG. 16 is a cut-away side view of a variation of the valve assembly of FIGS. 1 through 2B including a floating poppet design in a "closed" position in accordance with yet another embodiment of the invention.

Referring next to FIG. 16, a cut-away side view is shown of a variation of the valve assembly of FIGS. 1 through 2B including a floating poppet design in a "closed" position in accordance with yet another embodiment of the invention. Shown is the valve assembly 1600 which includes the same components as illustrated in FIGS. 2A and 2B; however, includes a floating poppet 1602 design. The floating poppet 1602 includes a poppet retainer 1604. All other components are as earlier described.

This embodiment of the valve assembly 1600 illustrates another embodiment of a "self aligning head assembly". Instead of being attached to the stem 122, the valve head, e.g., the floating poppet 1602, rests between the poppet retainer 1604 and the valve seat 202. Note that the self-aligning head assembly is coupled to the primary diaphragm 124. As shown in the closed position, the respective actuator balls 222 are within the detents 226 of the actuator 110, which causes the spring 220 to press the washer 218 and thus, the sleeve portion 204 (since the ring portion 206 is deflectable) toward the valve seat 202. This causes the stem 122 to move toward the valve seat 202. The floating poppet 1602 is then tightly held against the valve seat 202. The floating poppet 1602 self aligns since it is ideally rounded or includes a rounded surface.

In this embodiment, the stem 122 may be a flexible stem or may be a rigid stem and the floating poppet will still self align into the valve seat. For example, even if the stem 122 is entirely rigid, the floating poppet will rotate and settle fully into the valve seat 202, even if the stem 122 is slightly mis-aligned with the floating poppet 1602. Note that the poppet retainer 1604 is shown as a small block shaped device; however, the shape of the poppet retainer 1604 may be curved or curvilinear with the exterior surface of the floating poppet 1602.

Figure 17:
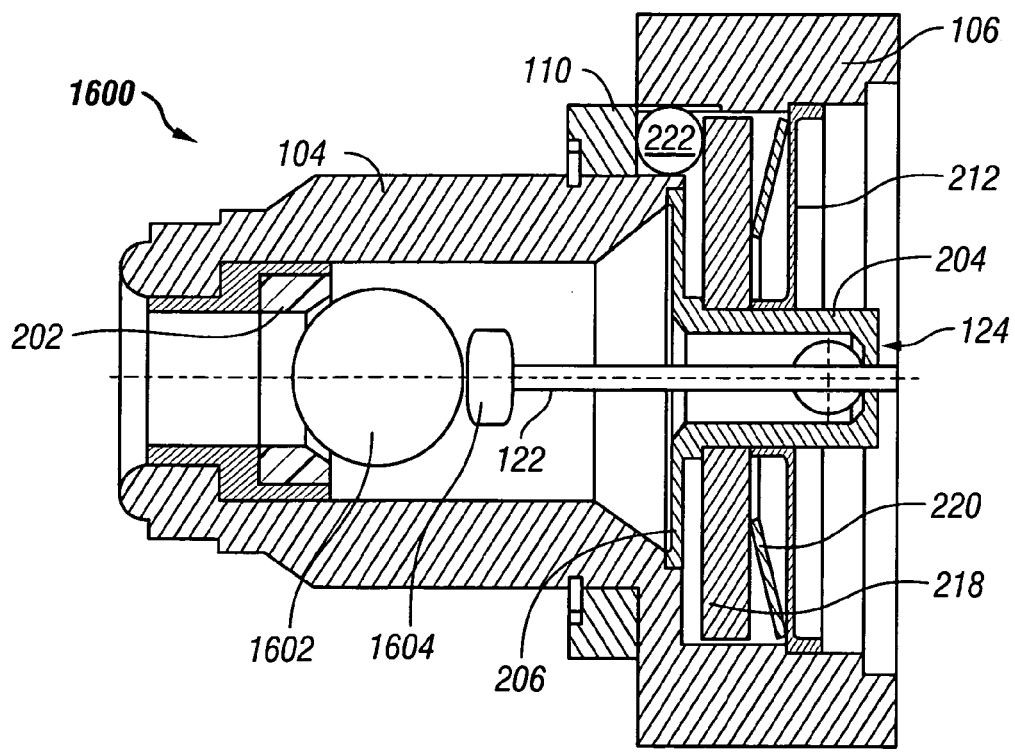
FIG. 17 is a cut away view of the valve assembly of FIG. 16 illustrated in an "open" position.

Referring next to FIG. 17, a cut away side view is shown of the valve assembly of FIG. 16 illustrated in an "open" position. As the actuator 110 is rotated, the respective balls 222 are moved from within each detent 226 such that the ball 221 forces the washer 218 against the spring 220, causing the sleeve portion 204 to move away from the valve seat 202. Thus, since the ring portion 206 is deflectable, the stem 122 and poppet retainer 1604 move away from the valve seat 202 such that the floating poppet 1602 will unseal from the valve seat 202 as shown. Note that the stem 122 does not move far enough for the floating poppet 1602 to fall out from in between the poppet retainer 1604 and the valve seat 202. Furthermore, the floating poppet 1602 only needs to slightly unseat from the valve seat 202 to allow a desired flow rate of the process flow through the valve assembly 1600.

Figure 18:
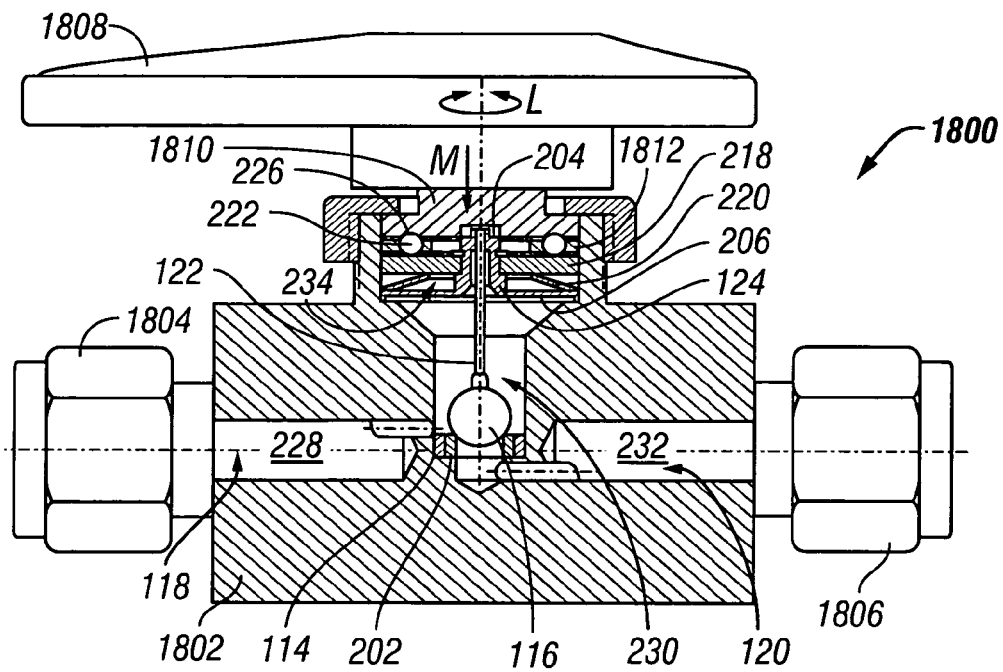
FIG. 18 is a cut away side view of a variation of the valve assembly of FIGS. 2A and 2B adapted to fit within an industry standard valve system in accordance with another embodiment of the invention.

Referring next to FIG. 18, a cut away side view is shown of a variation of the valve assembly of FIGS. 2A and 2B adapted to fit within an industry standard valve system in accordance with another embodiment of the invention. Shown is a valve assembly 1800 including a valve body 1802 including two connectors 1804 and 1806 and an actuator handle 1808. The first opening 118 couples to connector 1804 and the second opening 120 couples to connector 1806. Also included is the seat assembly 114, the valve seat 202, poppet 116, stem 122, primary diaphragm 124 including a sleeve portion 204 and a ring portion 206. Also included are the washer 218, the spring 220, actuator balls 222, ball ring 1812, detents 226, and an actuator 1810. Also shown are the upstream volume 228, the intermediate volume 230, the downstream volume 232 and the non-gas wetted volume 234.

In operation, this embodiment illustrates that the components of the mechanically actuated valve assembly, e.g., the valve assembly 200 of FIGS. 2A and 2B, may be adapted to fit within a standard valve assembly. In this embodiment, the first opening 118 and the second opening 120 form the inlet and outlet of the valve assembly 1800 and are each coupled to connectors 1804 and 1806 which may be connected to various devices depending on the application. As shown, the first opening 118 forms first volume, i.e., upstream volume 228, which opens into the intermediate volume 230. The poppet 116 is adapted to seal against the valve seat 202 is a self aligning manner, i.e., the stem 122 and the poppet 116 form a self-aligning head assembly with the valve seat 202. The second opening 120 forms a second volume, e.g., the downstream volume 232, such that the process flow moves through the first opening 118 into the intermediate volume 230, then passes between the poppet 116 and the valve seat 202 and exits through the downstream volume 232 via the second opening 120. Note that the process flow does not pass through the primary diaphragm 124, as described with reference to earlier embodiments. Thus, no flow holes are required in the primary diaphragm 124. Furthermore, note that the direction of the actuation force is transverse to the direction of the process flow, as opposed to axial with the actuator force.

The actuator assembly includes the actuator handle 1808 that is rotated in the direction of Arrow L, which causes the actuator 1810, which is preferably a structure having a flat surface that contacts the actuator balls 222. The actuator also includes detents 226 that the actuator balls 222 sit into. When the actuator handle 1808 is rotated, the actuator 1810 is rotated causing the balls 222 to move out from the detents applying pressure in the direction Arrow M. This forces the washer 218 in the direction of Arrow M, overcoming the force generated by spring 220 in the direction opposite to Arrow M, which causes the sleeve portion of the primary diaphragm to move in the direction Arrow M. This is allowed due the deflectable characteristics of the ring portion 206. Note that the actuator balls 222 are not allowed to move away from the detents 226 by the ball ring 1812, otherwise the balls 222 may roll out of alignment with the detents 226. Thus, the stem 122 and poppet 116 are moved in the direction of Arrow M to seal against the valve seat 202. Again, the stem 122 is flexible so that the poppet 116 will self-align into the valve seat 202.

To reopen the valve assembly 1800, the actuator handle 1808 is simply rotated until the balls 222 rest into the detents 226, removing the force in the direction of Arrow M, and allowing the spring 220 to push the sleeve portion 204 opposite of Arrow M. Thus, the poppet 116 is unsealed from the valve seat 202.

It is noted that this embodiment does not require a secondary diaphragm 212 or even actuator balls 222 or detents 226. For example, the secondary diaphragm 212 is not required since the process flow does not pass through the primary diaphragm 124. If the actuator handle is made to be threaded with the actuator 1810, then simply by turning the actuator handle, the actuator is forced in the direction of Arrow M.

However, it is preferable that the primary diaphragm still seal the intermediate volume 230 from the non-gas wetted volume 234 in order to prevent outboard leaks and to allow ease of operation of the actuator assembly. As such, the ring portion is sealed, e.g., welded, to the interior of the valve body 1802 at its peripheral edge.

It is also noted that this embodiment of the valve assembly 1800 may also include other types of "self-aligning head assemblies", such as the use of a floating poppet (see FIGS. 16 and 17). Furthermore, as described above, the valve assembly 1800 may use different materials, such as metals, ceramics, and elastomers, for example, depending on the application.

Figure 19:
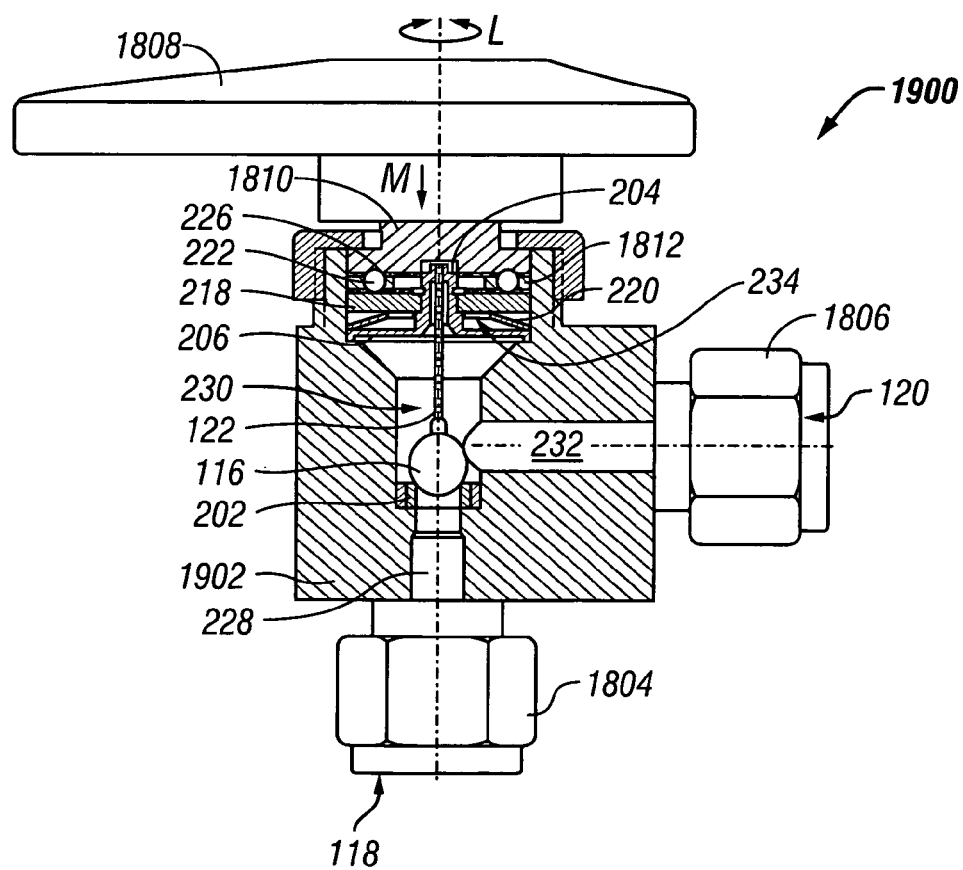
FIG. 19 is a cut away side view of a variation of the valve assembly of FIG. 18 in accordance with yet another embodiment of the invention.

Referring next to FIG. 19, a cut away side view is shown of a variation of the valve assembly of FIG. 18 in accordance with yet another embodiment of the invention. The valve assembly 1900 includes the same components as shown in FIG. 18; however, the valve body 1902 illustrates an alternate orientation of the first opening 118 and the second opening 120 forming a bent pipe where the first opening and the second opening are at a 90 degree angle with respect to each other.

Advantageously, in addition to the valve assembly 1800 of FIG. 18, the valve assembly 1900 can take advantage of the improved features of various embodiments of the invention and incorporate them into a standard valve body 1802, 1902. Thus, an ultra pure valve is created which depending on the composition of the valve seat 202 and poppet 116, which have low leak rates and high temperature capability.

Figure 20:
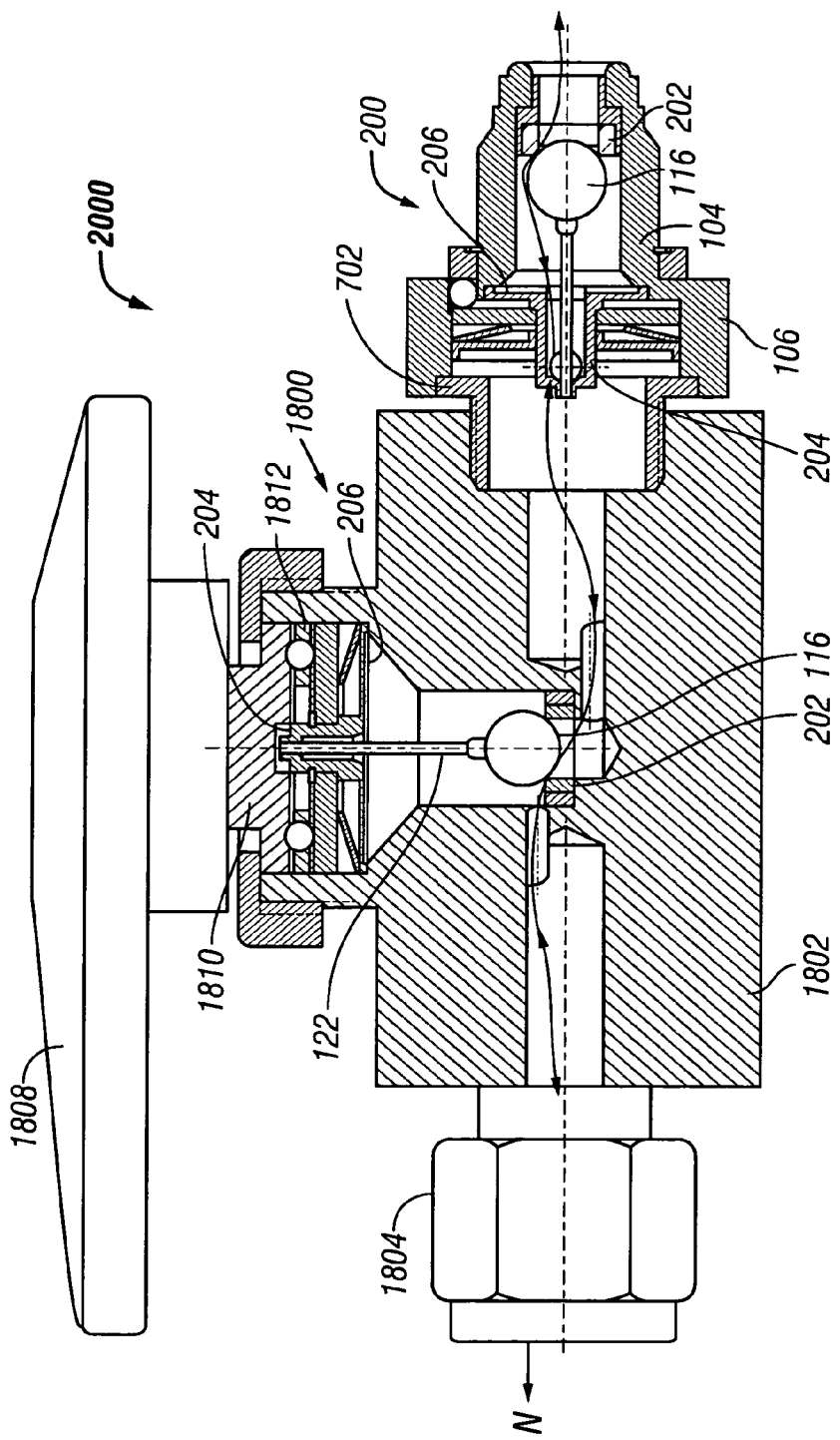
FIG. 20 is a cut away side view of a valve system connecting the valve assembly of FIG. 18 with a valve assembly of FIGS. 2A and 2B in accordance with another embodiment of the invention.

Referring next to FIG. 20, a cut away side view is shown of a valve system connecting the valve assembly of FIG. 18 with a valve assembly of FIGS. 2A and 2B in accordance with another embodiment of the invention. The combination valve system 2000 includes the valve assembly 1800 including connector 1804, but replacing connector 1806 with another valve assembly 200. The valve assembly 200 is attached to valve assembly 1800 via a threaded extension 702. In this embodiment, the process flow may be in either direction as indicated by Arrow N.

Advantageously, FIG. 20 depicts the compactness of the valve assembly 200 of FIGS. 2A and 2B, for example, and that the valve assembly 200 is an in-line valve. Furthermore, the entire valve assembly, including it actuator assembly fits within the footprint of a standard connector 1804. This represents a significant space savings over traditional valves that typically employ a large exterior dimension, e.g., the footprint of valve assembly 1800. Although discussed previously that the actuator assembly fits within the footprint of the valve body (104, 106), this concept is more clearly illustrated here by comparison to a standard valve body 1802 and actuator handle 1808. The standard valve body 1802 and actuator handle 1808 is much bulkier and further the actuator handle extends beyond the footprint of the valve body 1802, taking up a considerable amount of space.

Furthermore, the valve system 2000 provides two sealing points, a first at the poppet 116 and valve seat 202 of valve assembly 1800 and a second at the poppet 116 and valve seat 202 of valve assembly 200. Additionally, although valve assembly 1800 includes the components of the improved design in accordance with an embodiment of the invention, the valve assembly 1800 may include conventional valve components, e.g., either a poppet and seat arrangement or a seat and diaphragm arrangement, in contrast to the seat/self-aligning head assembly/diaphragm arrangement found in several embodiments of the invention. Thus, the valve assembly 200 may be used as a supplement to existing equipment already in place. For example, valve assembly 200 may be a supplemental safety device operating as a "shut-off" valve, for example. Thus, the valve assembly 200 may be easily used within existing architectures for additional sealing areas. Alternatively, the valve assembly 200 would completely replace a standard valve body 1802 having standard internal components (note that the design and arrangement of the internal components shown in FIG. 18 are not conventional, only the exterior, e.g., valve body 1802, connectors 1804 and 1806 and the actuator handle 1808).

Figure 21:
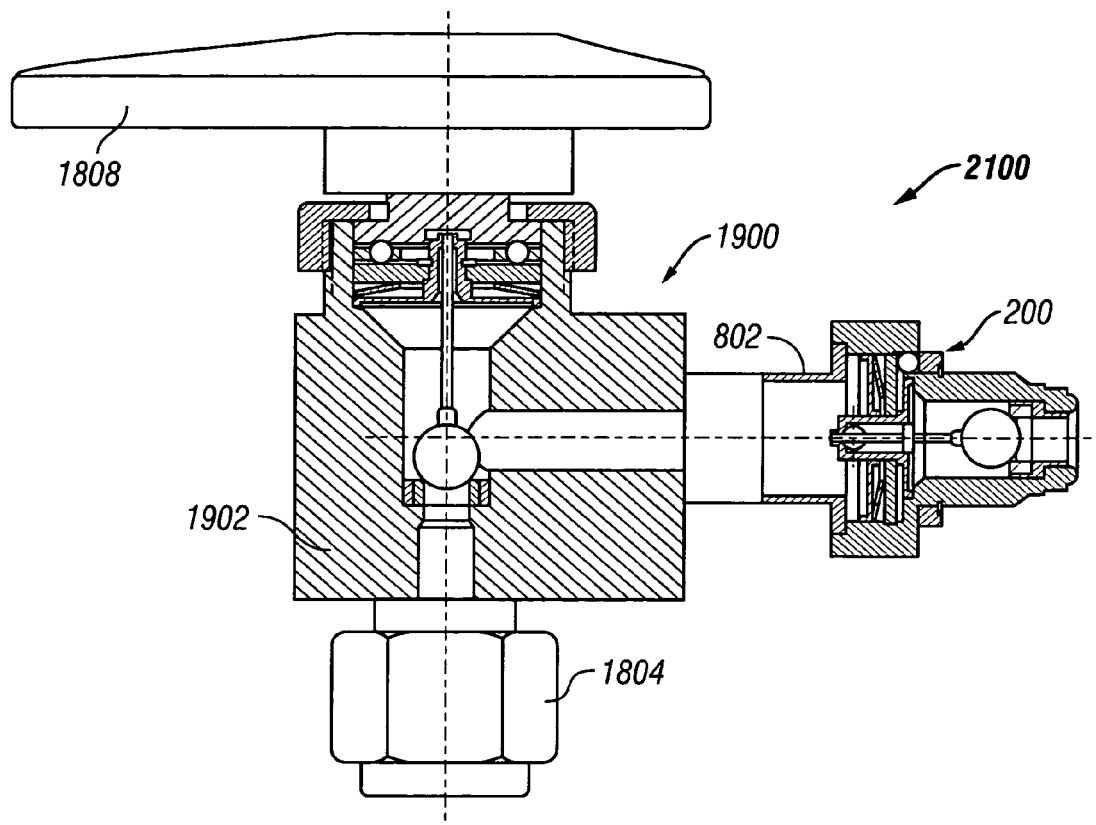
FIG. 21 is a cut away side view of a variation of the valve system of FIG. 20 in accordance with yet another embodiment of the invention.

Referring next to FIG. 21, a cut away side view is shown of a variation of the valve system of FIG. 20 in accordance with yet another embodiment of the invention. The valve system 2100 includes the same components as shown in FIG. 20; however, the valve body 1902 illustrates an alternate orientation of the first opening 118 and the second opening 120 forming a bent pipe where the first opening and the second opening are at a 90 degree angle with respect to each other. The combination valve system 2100 includes the valve assembly 1900 including connector 1804, but replacing connector 1806 with another valve assembly 200. The valve assembly 200 is attached to valve assembly 1800 via a tube valve extension 802, which may be welded or compression fit, for example to the valve body 1902.

Figure 22:
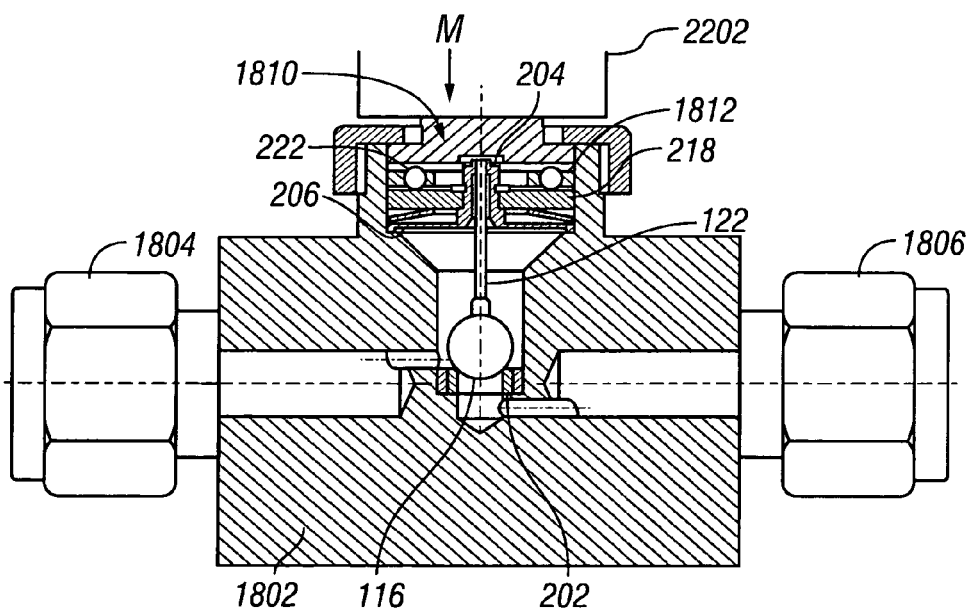
FIG. 22 is a cut away side view of a variation of the valve assembly of FIG. 18 illustrating a pneumatic or hydraulic actuator assembly in accordance with a further embodiment of the invention.

Referring next to FIG. 22, a cut away side view is shown of a variation of the valve assembly of FIG. 18 illustrating a pneumatic or hydraulic actuator assembly in accordance with a further embodiment of the invention. The valve assembly 2200 includes the same components as illustrated in FIG. 18; however, the method of actuation is a conventional pneumatic source 2202.

The valve assembly 2200 uses a standard pneumatic source 2202 as is known in the art to standard pneumatically actuated valves. The pneumatic source 2202 provides a force in the direction of Arrow M which presses the actuator 1810 into the balls 222 (held in position by the ball ring 1810) forcing the washer 218, thus, the sleeve portion 204 in the direction of Arrow M, which seals the poppet 116 into the valve seat 202. When the force in the direction of Arrow M is removed, the spring 220 presses back opposite the direction of Arrow M unsealing the poppet 116 from the valve seat 202.

It is noted that this embodiment does not require actuator balls 222 or the ball ring 1812, since the actuator 1810 may apply pressure directly to the washer 218; however, the use of the actuator balls 222 is preferred since it provides an even distribution of the force in the direction of Arrow M on the washer.

Figure 23:
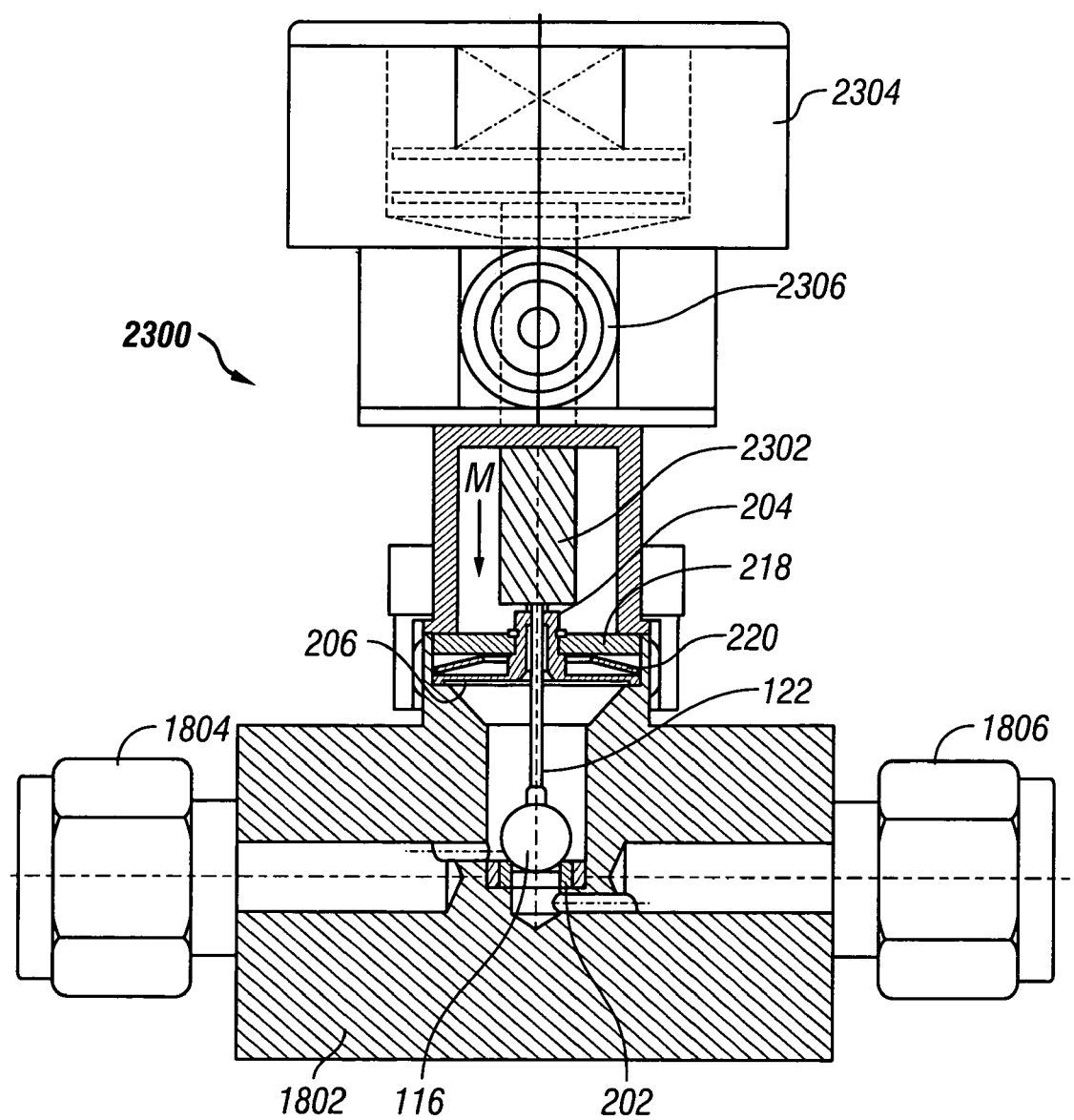
FIGS. 23 and 24, are standard pneumatic valves having modified internal components including a poppet attached to the stem, which is attached to the primary diaphragm, and alternatively having a free floating poppet and stem attached to a primary diaphragm, respectively in accordance with further embodiments.

Next, referring to FIG. 23, a standard pneumatic valve assembly 2300 is shown having modified components including a poppet 116 attached to the stem 122, which is attached to the sleeve portion 204 of the primary diaphragm. The spring 220 is positioned in between the ring portion 206 and the washer 218. Again, there are no flow holes in the primary diaphragm. This embodiment does not utilize actuator balls 222 as shown in FIGS. 18-22. A rigid actuator member or piston 2302 applies pressure in the direction of Arrow M, which moves the washer 218 and the sleeve portion 204 also in the direction of Arrow M, thus, compressing the spring 220. This seals the poppet 116 into the valve seat 202. Also shown is a standard pneumatic driven piston 2304 assembly, which drives the piston 2302. And a standard threaded port 2306 includes a pipe thread and provides the air or gas supply to actuate the pneumatic piston 2302.

Figure 24:
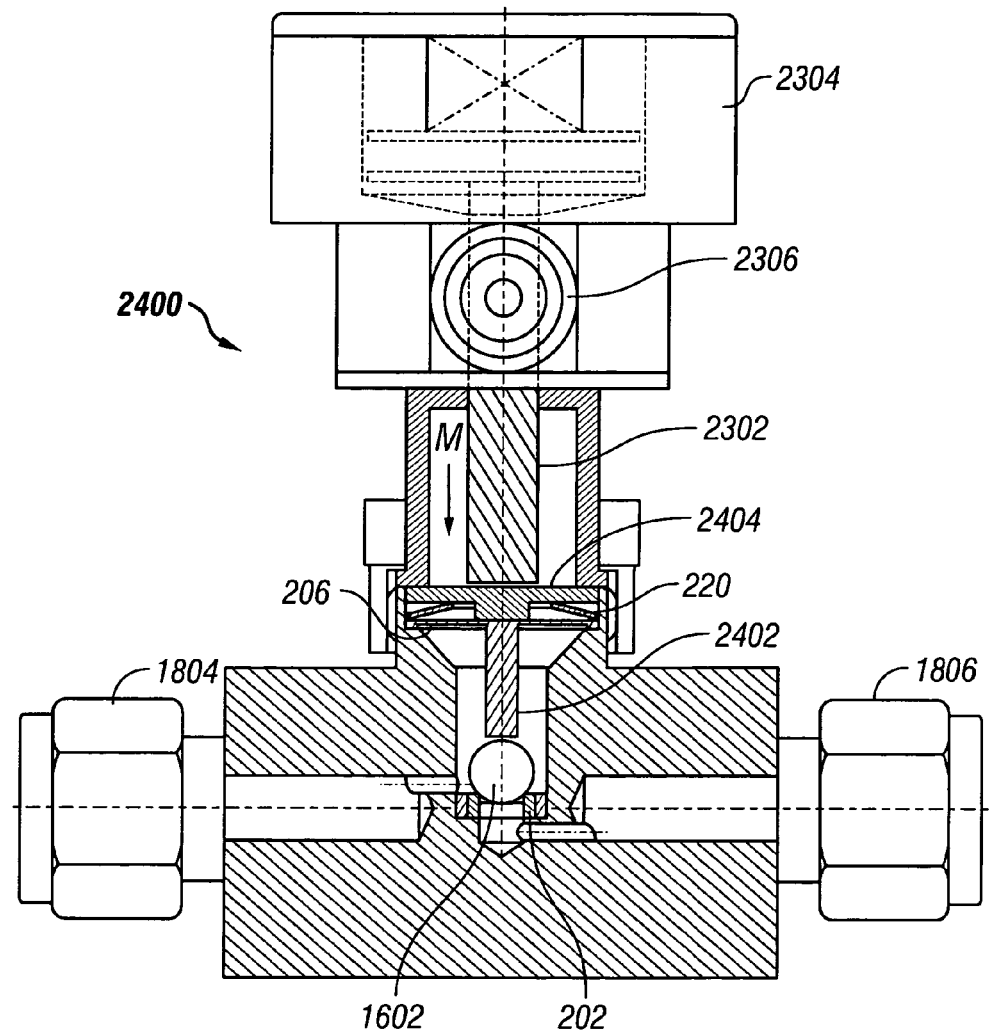

Referring next to FIG. 24, another embodiment of a standard pneumatic valve assembly 2400 is shown having modified components including a free floating poppet 1602 and rigid stem 2402 attached to a primary diaphragm, respectively. In this embodiment, the rigid stem 2402 is attached to the ring portion 206. There is no sleeve portion in this embodiment. An actuating piece 2404 replaces the washer and sleeve portion. The actuating piece is positioned between the spring 220 and the actuating member 2302. The actuating piece 2404 is a solid component resembling the washer having the middle solid and extending through the opening in the spring 220 to contact the rigid stem 2402. In response to air or gas supply from the threaded port 2306, the pneumatic driven piston assembly 2304 moves the piston 2302 in the direction of Arrow M, which moves the washer 218 and the actuating piece 2404 also in the direction of Arrow M, thus, compressing the spring 220. The middle of the actuating piece 2404 pushes into the stem 2402 which pushes the free floating poppet 1602 in to the valve seat 202. Upon release of the pressure, the spring 220 presses back on the actuating piece 2404 causing the stem 2404 to release the free floating poppet 1602 from the valve seat 202. As shown in each diagram, the actuating device is a pneumatic device.

Figure 25:
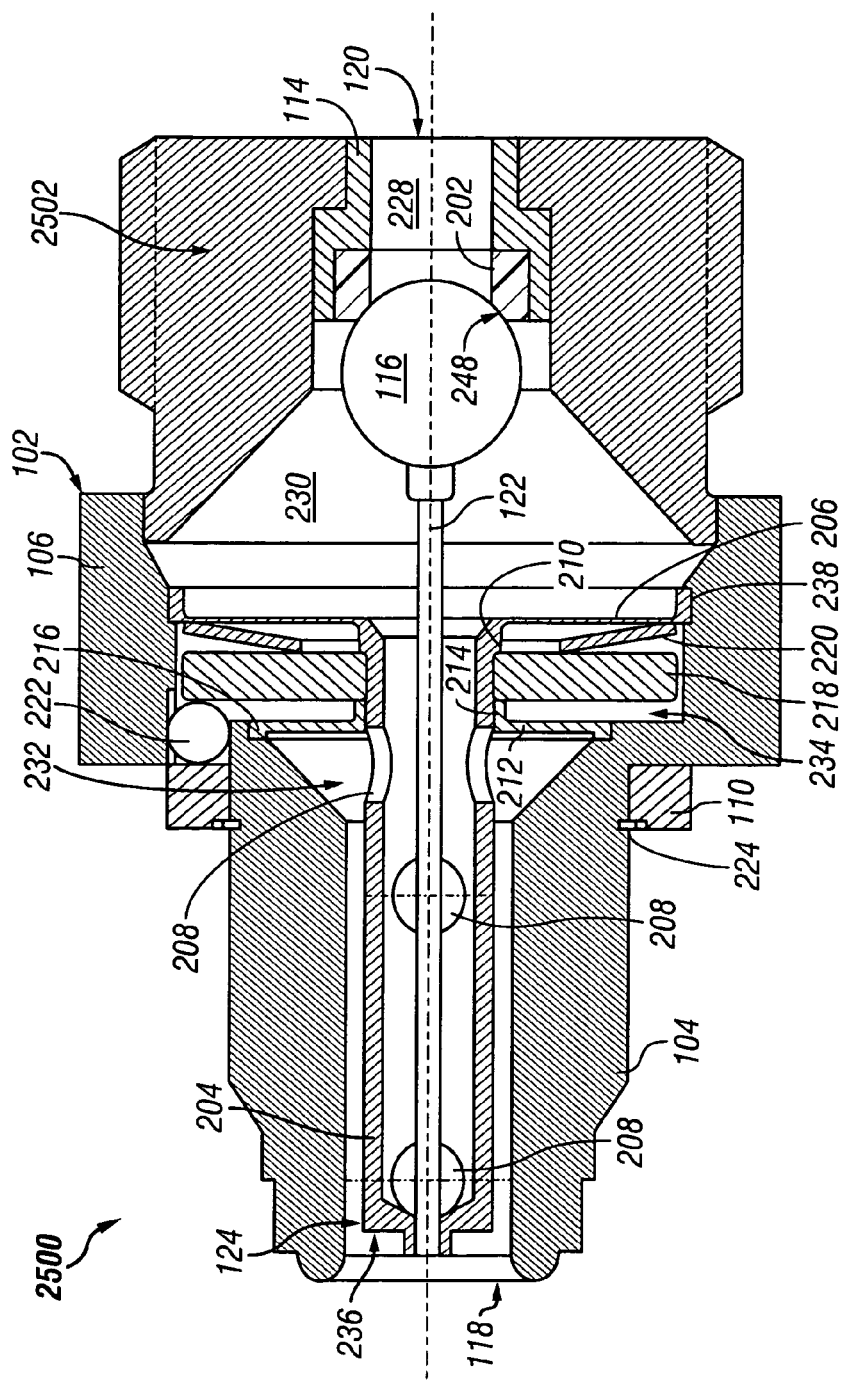
FIG. 25 is a cut away side view of another embodiment of the valve assembly of FIGS. 2A and 2B having internal components arranged in a reverse orientation and illustrated in a "closed" position in accordance with one embodiment of the invention.

Next, referring to FIG. 25, a cut away side view of another embodiment of the valve assembly 2500 of FIGS. 2A and 2B having internal components arranged in a reverse orientation and illustrated in a "closed" position in accordance with one embodiment of the invention. The components are basicly the same, simply reversed. The valve seat 202 is located within an extension 2502, similar to threaded extension 702. As can be seen, the sleeve portion 204 extends a greater distance through the opening in the secondary diaphragm 212 than the embodiments of FIGS. 2A and 2B. Additionally, the sleeve portion 204 contains multiple flow holes 208 arranged along the length of the sleeve portion 204 that extends through the secondary diaphragm 212. In order to accommodate the length of the stem 122 extending out of the back of the body portion 106, the extension 2502 is included which includes the seat assembly 114 and the valve seat 202. In operation, upon rotating the actuator 110, the actuator ball 222 slips into a detent (not shown). This causes the spring 220 to press the washer 218 back into the inner lip of the secondary diaphragm 212, such that the secondary diaphragm 212 and the ring portion 206 deflect away from the valve seat 202. This causes the sleeve portion 204, the stem 122 and the poppet 116 to move away from the valve seat; thus, unsealing the poppet 116 from the valve seat 202.

It is noted that this valve assembly 2500 may be designed according to one or more of the embodiments described herein, for example, different types of actuators and different material selections. Additionally, the primary diaphragm 124 and the secondary diaphragm may be designed to be a balanced diaphragm assembly. In this instance, it is noted that the illustration is not drawn to complete scale such that the secondary diaphragm 212 appears must smaller than the ring portion 206, when in reality they are designed to have similar surface areas exposed to the respective flow volumes.

While the invention herein disclosed has been described by means of specific embodiments and applications thereof, numerous modifications and variations could be made thereto by those skilled in the art without departing from the scope of the invention set forth in the claims.

What is claimed is:

1. A shut-off valve assembly comprising:
   a hollow valve body having a first opening and a second opening;
   a valve seat positioned within the hollow valve body proximate to the first opening;
   a first diaphragm assembly, wherein a deflectable portion of the first diaphragm assembly is attached to an interior surface of the hollow valve body forming a first volume between the valve seat and the first diaphragm assembly;
   wherein the first diaphragm assembly comprises a sleeve portion, and the sleeve portion comprises an open end and a length;
   a second diaphragm attached to another portion of the interior of the hollow valve body and attached to the first diaphragm assembly such that a second volume is defined between the second diaphragm and the second opening, wherein a third volume is formed between the first diaphragm assembly and the second diaphragm, the third volume sealed from the first volume and the second volume by the first diaphragm assembly and the second diaphragm;
   at least one flow hole formed in the first diaphragm assembly, wherein the at least one flow hole allows a process flow to flow between the first volume and the second volume; and
   a self-aligning head assembly comprising;
      a stem attached at a first end to another portion of the first diaphragm assembly;
      wherein the stem allows the process flow to flow through the open end of the sleeve portion, through the length of the sleeve portion, and out through the flow hole; and
      a valve head coupled to a second end of the stem;

wherein a deflection of the deflectable portion of the first diaphragm assembly and the second diaphragm allows the other portion of first diaphragm assembly to move in order to open and close the valve head from the valve seat.

2. The assembly of claim 1 wherein the valve head comprises a floating valve head held in position between the second end of the stem and the valve seat by the second end of the stem.

3. The assembly of claim 1 wherein the valve head is attached to the second end of the stem, the stem comprising a flexible stem.

4. The assembly of claim 1 wherein the valve head comprises a poppet wherein at least a portion of the poppet is spherical.

5. The assembly of claim 1 wherein the valve head is adapted to self-align into the valve seat with a leak rate of less than or equal to $4 \times 10^{-9}$ atmosphere cc of Helium/sec.

6. The assembly of claim 1 wherein the process flow generally flows in-line through the hollow valve body between the first opening and the second opening via the first volume and the second volume.

7. The assembly of claim 1 further comprising an actuator assembly coupled to the first diaphragm assembly and the second diaphragm for causing the deflection of the deflectable portion of the first diaphragm assembly and the second diaphragm.

8. The assembly of claim 7 wherein the actuator assembly is a type selected from a group consisting of a mechanical actuator assembly, an electromagnetic actuator assembly, a piezoelectric actuator assembly, a pneumatic actuator assembly and a hydraulic actuator assembly.

9. The assembly of claim 7 wherein the actuator assembly is substantially contained within an external footprint of the hollow valve body.

10. The assembly of claim 7 wherein the actuator assembly provides an actuating force axial to the movement of the process flow through the hollow valve body.

11. The assembly of claim 7 wherein the actuator assembly variably deflects the deflectable portion of the first diaphragm assembly and the second diaphragm which moves the other portion of the first diaphragm assembly a variable distance, such that the position of the valve head relative to the valve seat is variably selectable, wherein giving the shut-off valve assembly capabilities of a proportional valve assembly.

12. The assembly of claim 7 wherein the deflectable portion comprises a ring portion and the other portion of the first diaphragm assembly comprises a sleeve portion.

13. The assembly of claim 12 wherein the actuator assembly further comprises a washer positioned within the third volume and surrounding the sleeve portion, wherein the washer contacts the second diaphragm.

14. The assembly of claim 13 wherein the actuator assembly further comprises a spring within the third volume located between the second diaphragm and a first side of the washer, wherein the spring contacts the second diaphragm and the first side of the washer and exerts pressure against the first side of the washer, wherein the first diaphragm assembly is held such that the valve head is sealed into the valve seat.

15. The assembly of claim 14 wherein the actuator assembly further comprises an actuator member coupled to an actuator, wherein upon operation of the actuator, the actuator member applies a force against a second side of the washer, causing the washer to deflect the second diaphragm and the ring portion of the first diaphragm assembly in an opposite direction as held by the spring, wherein the valve head is caused to unseal from the valve seat.

16. The assembly of claim 15 wherein the actuator member comprises a ball held between the actuator and the washer.

17. The assembly of claim 15 wherein the actuator comprises a ring having a detent, wherein the actuator member sits within the detent, wherein upon rotation of the actuator, the actuator member is forced out of the detent such that the actuator member applies pressure against the second side of the washer.

18. The assembly of claim 1 wherein the valve head seals into the valve seat at the leak rate at temperatures up to 1000 degrees centigrade.

19. The assembly of claim 1 wherein the surface area of the deflectable portion of the first diaphragm assembly facing the first volume is approximately equal to the surface area of the second diaphragm facing the second volume, such that a first force exerted on the deflectable portion by the process flow in the first volume substantially cancels the force in the opposite direction exerted on the second diaphragm by the process flow in the second volume, wherein the first diaphragm assembly and the second diaphragm are substantially balanced with respect to the pressure of the process flow.

20. A valve assembly comprising:
 a hollow valve body having a first opening and a second opening;
 a valve seat positioned within the hollow valve body;
 a first diaphragm assembly having a ring portion and a sleeve portion, wherein a perimeter of the ring portion is attached to an interior surface of the hollow valve body such that a first volume is defined between the valve seat and the first diaphragm assembly;
 wherein the first diaphragm assembly comprises a sleeve portion, the sleeve portion comprises an open end and a length;
 a second diaphragm attached at a perimeter surface to the another portion of the interior of the hollow valve body and attached to the sleeve portion such that a second volume is defined between the second diaphragm and the second opening, wherein a third volume is formed between the first diaphragm assembly and the second diaphragm, the third volume sealed from the first volume and the second volume by the first diaphragm assembly and the second diaphragm;
 at least one flow hole formed in the sleeve portion, wherein the at least one flow hole allows a process flow to flow between the first volume and the second volume;
 a self-aligning head assembly comprising:
  a stem coupled at one end to the first diaphragm assembly;
  wherein the stem allows the process flow to flow through the open end of the sleeve portion, through the length of the sleeve portion, and out through the flow hole; and
  a valve head coupled to another end of the stem, wherein the valve head is adapted to self-align into the valve seat; and
 an actuator assembly coupled to the first diaphragm assembly and the second diaphragm for deflecting the ring portion of the first diaphragm assembly and the second diaphragm which moves the sleeve portion and which controls the position of the valve head relative to the valve seat.

21. The assembly of claim 20 wherein the actuator assembly deflects the first diaphragm and the second diaphragm to open and close the valve head from the valve seat, wherein creating a shut-off valve assembly.

22. The assembly of claim 21 wherein the valve head is adapted to seal into the valve seat with a leak rate of less than or equal to $4 \times 10^{-9}$ atmosphere cc of Helium/sec.

23. The assembly of claim 22 wherein the valve head is adapted to seal into the valve seat with the leak rate at temperatures up to 1000 degrees centigrade.

24. The assembly of claim 20 wherein the actuator assembly variably deflects the ring portion of the first diaphragm assembly and the second diaphragm which moves the sleeve portion a variable distance, such that the position of the valve head relative to the valve seat is variably selectable, wherein creating a proportional valve assembly.

25. The assembly of claim 24 wherein, in one position, the actuator assembly causes the valve head to seal into the valve seat with a leak rate of less than or equal to $4 \times 10^{-9}$ atmosphere cc of Helium/sec.

26. The assembly of claim 20 wherein the valve head comprises a floating valve head held in position between the second end of the stem and the valve seat by the second end of the stem.

27. The assembly of claim 20 wherein the valve head is attached to the second end of the stem, the stem comprising a flexible stem.

28. The assembly of claim 20 wherein at least a portion of the valve head is spherical.

29. The assembly of claim 20 wherein the surface area of the ring portion of the first diaphragm assembly facing the first volume is approximately equal to the surface area of the second diaphragm facing the second volume, such that a first force exerted on the ring portion by the process flow in the first volume substantially cancels the force in the opposite direction exerted on the second diaphragm by the process flow in the second volume, wherein the first diaphragm assembly and the second diaphragm are substantially balanced with respect to the pressure of the process flow.

30. The assembly of claim 20 wherein the process flow generally flows in-line through the hollow valve body between the first opening and the second opening via the first volume and the second volume.

31. The assembly of claim 20 wherein the actuator assembly is a type selected from a group consisting of a mechanical actuator assembly, an electromagnetic actuator assembly, a piezoelectric actuator assembly, a pneumatic actuator assembly and a hydraulic actuator assembly.

32. The assembly of claim 20 wherein the actuator assembly is substantially contained within an external footprint of the hollow valve body.

33. The assembly of claim 20 wherein the actuator assembly provides an actuating force axial to the movement of the process flow through the hollow valve body.

34. A valve assembly comprising:
a hollow valve body having a first opening at one end of the hollow valve body and a second opening at an opposite end of the hollow valve body;
a valve seat positioned within the hollow valve body;
a first diaphragm assembly having a ring portion and a sleeve portion, wherein a perimeter of the ring portion is attached to an interior surface of the hollow valve body such that a first volume is defined between the valve seat and the first diaphragm assembly;
wherein the first diaphragm assembly comprises a sleeve portion, the sleeve portion comprises an open end, and a length;
a second diaphragm attached to the another portion of the interior of the hollow valve body and attached to the sleeve portion of the first diaphragm assembly such that a second volume is defined between the second diaphragm and the second opening, wherein a third volume is formed between the first diaphragm assembly and the second diaphragm, the third volume sealed from the first volume and the second volume by the first diaphragm assembly and the second diaphragm;
at least one flow hole formed in the sleeve portion, wherein the at least one flow hole allows a process flow to flow between the first volume and the second volume; and
a valve head coupled to the sleeve portion, wherein the valve head is adapted to seal into the valve seat; and
a stem coupled at one end to the first diaphragm assembly;
wherein the stem allows the process flow to flow through the open end of the sleeve portion, through the length of the sleeve portion, and out through the flow hole;
an actuator assembly coupled to the first diaphragm assembly and the second diaphragm for deflecting the ring portion of the first diaphragm assembly and the second diaphragm which moves the sleeve portion and which controls the position of the valve head relative to the valve seat;
wherein a surface area of the ring portion facing the first volume is approximately equal to a surface area of the second diaphragm facing the second volume, such that a first force exerted on the ring portion by the process flow in the first volume substantially cancels a second force in the opposite direction exerted on the second diaphragm by the process flow in the second volume, wherein the first diaphragm assembly and the second diaphragm are substantially balanced with respect to the pressure of the process flow.

35. The assembly of claim 34 wherein the process flow generally flows in-line through the hollow valve body between the first opening and the second opening via the first volume and the second volume.

36. The assembly of claim 34 wherein an actuation force required to deflect the ring portion and the sleeve portion is greater than a differential force on the ring portion and the second diaphragm, wherein the differential force is defined as the difference between the first force and the second force.

37. The assembly of claim 34 wherein an actuation force required to deflect the ring portion and the sleeve portion is less than the first force.

38. The assembly of claim 34 wherein an actuation force required to deflect the ring portion and the sleeve portion is less than the second force.

39. The assembly of claim 34 wherein a surface area of the ring portion facing the third volume is approximately equal to a surface area of the second diaphragm facing the third volume, such that a third force exerted on the ring portion by atmospheric pressure in the third volume substantially cancels a fourth force in the opposite direction exerted on the second diaphragm by the atmospheric pressure in the third volume, wherein the first diaphragm assembly and the second diaphragm are substantially balanced with respect to the atmospheric pressure within the third volume.

40. The assembly of claim 34 wherein, the actuator assembly is a type selected from a group consisting of a mechanical actuator assembly, an electromagnetic actuator assembly, a piezoelectric actuator assembly, a pneumatic actuator assembly and a hydraulic actuator assembly.

41. The assembly of claim 34 wherein the actuator assembly is substantially contained within an external footprint of the hollow valve body.

42. The assembly of claim 34 wherein the actuator assembly provides an actuating force axial to the movement of the process flow through the hollow valve body.

43. The assembly of claim 34 wherein the actuator assembly deflects the first diaphragm and the second diaphragm to open and close the valve head from the valve seat wherein creating a shut-off valve assembly.

44. The assembly of claim 43 wherein the valve head is adapted to seal into the valve seat with a leak rate of less than or equal to $4 \times 10^{-9}$ atmosphere cc of Helium/sec.

45. The assembly of claim 34 wherein the actuator assembly variably deflects the ring portion of the first diaphragm assembly and the second diaphragm which moves the sleeve portion a variable distance, such that the position of the valve head relative to the valve seat is variably selectable, wherein creating a proportional valve assembly.

46. The assembly of claim 34 wherein the valve head comprises a floating valve head held in position relative to the valve seat by one end of a stem, the other end of the stem is attached to the sleeve portion.

47. The assembly of claim 34 wherein the valve head is attached to one end of a flexible stem, the other end of the flexible stem is attached to the sleeve portion.

* * * * *